US012783194B2

(12) United States Patent
Lee et al.

(10) Patent No.: US 12,783,194 B2
(45) Date of Patent: Nov. 3, 2026

(54) COOPERATION PLATFORM BETWEEN EDGE AND CLOUD FOR PROVIDING SIGNAGE

(71) Applicant: LG ELECTRONICS INC., Seoul (KR)

(72) Inventors: Jinsang Lee, Seoul (KR); Sujin Kim, Seoul (KR); Jinho Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 18/864,092

(22) PCT Filed: Jul. 8, 2022

(86) PCT No.: PCT/KR2022/009968
§ 371 (c)(1),
(2) Date: Nov. 8, 2024

(87) PCT Pub. No.: WO2024/010125
PCT Pub. Date: Jan. 11, 2024

(65) Prior Publication Data
US 2025/0328298 A1 Oct. 23, 2025

(51) Int. Cl.
*G06F 3/14* (2006.01)
*B60K 35/29* (2024.01)
(Continued)

(52) U.S. Cl.
CPC ................ *G06F 3/14* (2013.01); *B60K 35/29* (2024.01); *G06F 16/435* (2019.01);
(Continued)

(58) Field of Classification Search
CPC ....... G06T 19/006; G06F 3/14; G06F 16/438; B60K 35/29
(Continued)

(56) References Cited

U.S. PATENT DOCUMENTS 11,367,109 B2 * 6/2022 Cattone .............. G06Q 30/0261
2004/0192351 A1 * 9/2004 Duncan .................. G06Q 30/02 455/566

(Continued)

FOREIGN PATENT DOCUMENTS

KR 10-2019-0107286 A 9/2019
KR 10-2021-0038294 A 4/2021
KR 10-2022-0062661 A 5/2022

*Primary Examiner* — Thomas J Lett
(74) *Attorney, Agent, or Firm* — Birch, Stewart, Kolasch & Birch, LLP

(57) ABSTRACT

The present disclosure relates to a system and method for cooperation between the edge and the cloud capable of efficiently providing signage to users through proper cooperation of the edge and the cloud according to at least one of the situation of an edge device and the characteristics of edge data. The present disclosure may provide a method for providing data for a vehicle display device, comprising the steps of: receiving driving context data from a vehicle; collecting signage-related information from an external data source; extracting, on the basis of the driving context data, first signage-related information corresponding to the vehicle from among the collected signage-related information; determining, on the basis of the driving context data, a display policy for media content to be displayed in the vehicle; determining a processing position of the first signage-related information on the basis of the driving context data and the first signage-related information; and transmitting the first signage-related information on the basis of the determined processing position.

19 Claims, 22 Drawing Sheets

(51) Int. Cl.
*G06F 16/435* (2019.01)
*G06F 16/438* (2019.01)
*G06T 19/00* (2011.01)

(52) U.S. Cl.
CPC .......... *G06F 16/438* (2019.01); *G06T 19/006* (2013.01); *B60K 2360/164* (2024.01); *B60K 2360/186* (2024.01)

(58) Field of Classification Search
USPC .......................................................... 345/632
See application file for complete search history.

(56) References Cited

U.S. PATENT DOCUMENTS

| | | | |
|---|---|---|---|
| 2020/0118172 | A1 | 4/2020 | Jaegal |
| 2021/0097762 | A1* | 4/2021 | Spivak .................... G06F 3/011 |
| 2021/0281638 | A1 | 9/2021 | Vrcelj et al. |
| 2022/0182467 | A1 | 6/2022 | Hutten et al. |

* cited by examiner

FIG. 6

| Input data (Edge data) | Detailed data configuration | Output data (Driving context data) |
|---|---|---|
| User information | · Personal information registered when signing up for service, such as gender, age, and residence | · Driving path data<br>: Expected driving path<br>: Information on sections and points where signage is to be exposed along path<br>· Safe driving related data<br>: Safety rating for current driving section<br>· Computing power of vehicle system<br>: Resource information processable in real time in vehicle<br>· Signage displayable area<br>· Communication environment information<br>· User information and profile |
| Map/ navigation guidance information | · Path information to destination (navigation path)<br>· Guidance information (Turn-by-Turn)<br>· Destination/waypoint<br>: If destination is on road or in building parking lot<br>· Multiple map attribute information<br>: Road type/attributes, width of road and lane, curvature, slope, speed limit, etc. | |
| Dynamic information | · Traffic information (road unit traffic, lane unit traffic)<br>· Event information (accident, hazard warning, etc.)<br>· Weather<br>· AR coupon usage information around current (information from other users)<br>· Communication environment information | |
| Vehicle sensor information | · Current location information (GPS/DR)<br>· Camera input information (ADAS information, and object recognition information)<br>· V2X(real-time surrounding information collected through V2V and V2I)<br>· Information on remaining fuel/filling amount, consumable replacement period, etc. | |
| User profile | · Past driving path<br>· User registration preferred brand, interest category information(registered hashtags, etc.)<br>· Recent destinations, recent searches, and user registration information<br>· Information on main activity areas<br>· History of downloaded coupon usage | |
| Other driving related information | · Driving mode<br>: Manual, autonomous, semi-autonomous, whether ADAS function operates or not, etc.)<br>· Electronic horizon information (forward drivable path information) | |

(13-1) (13-2)

FIG. 15
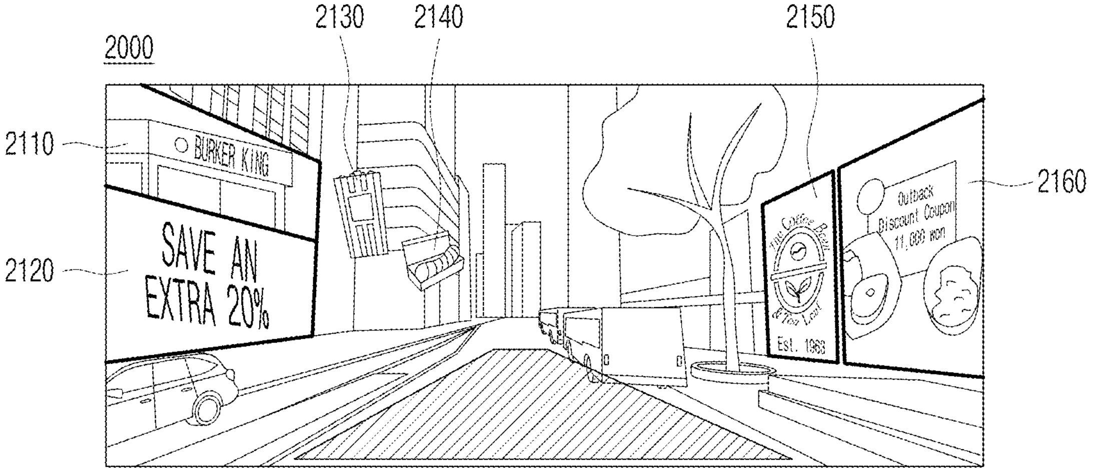
(15-1)
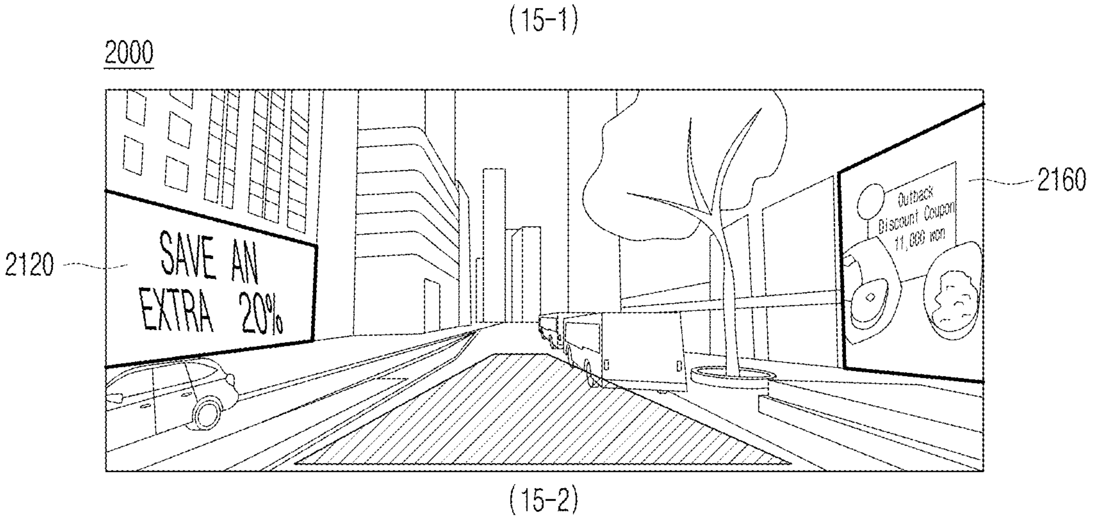
(15-2)

FIG. 17
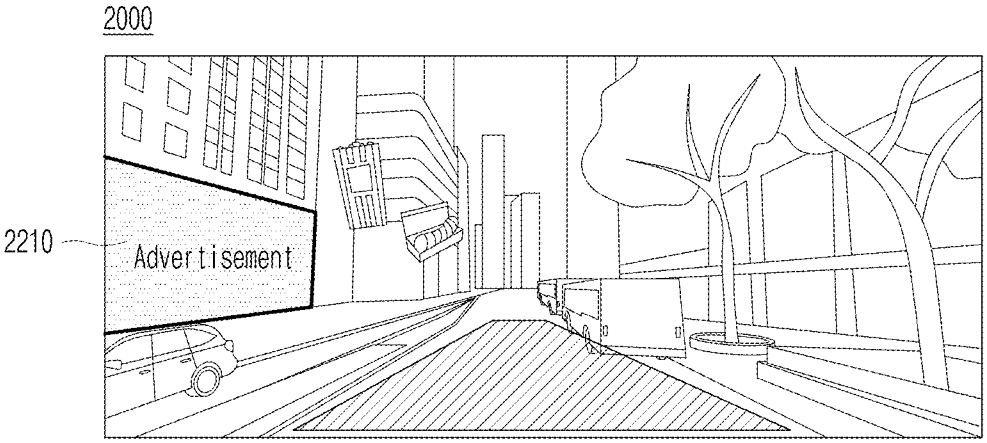
(17-1)
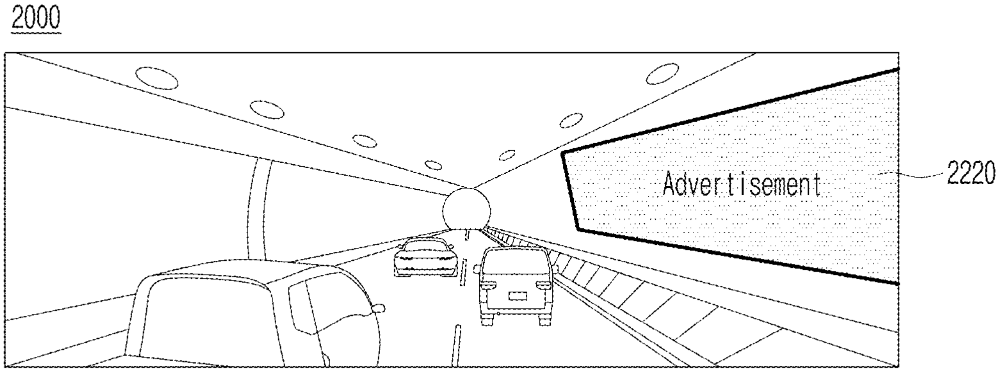
(17-2)

FIG. 20
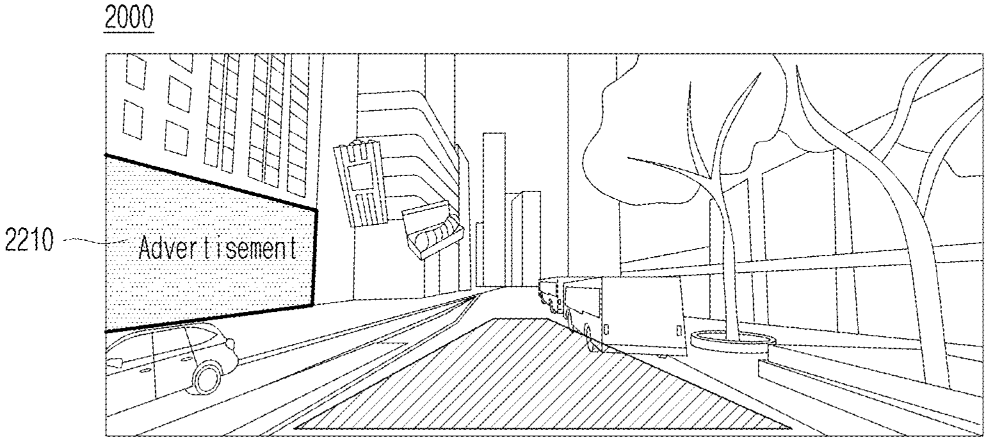
(20-1)
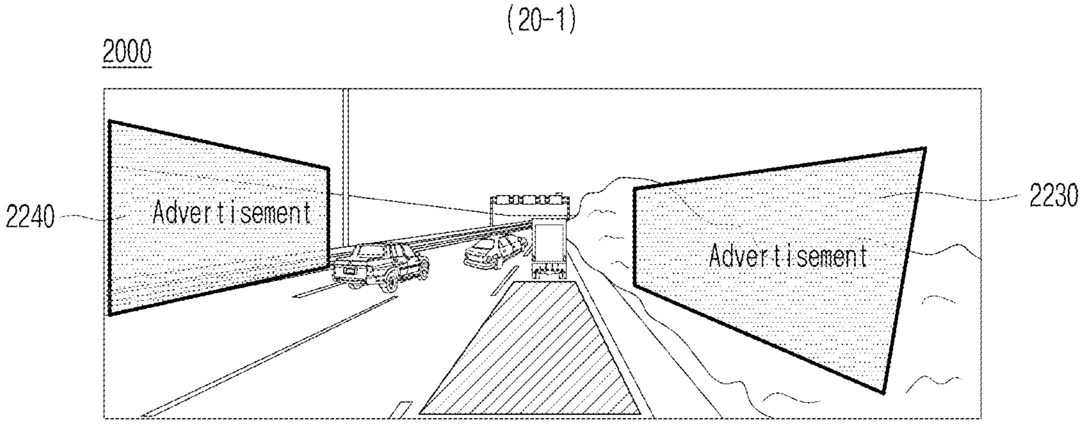
(20-2)

COOPERATION PLATFORM BETWEEN EDGE AND CLOUD FOR PROVIDING SIGNAGE

CROSS REFERENCE TO RELATED APPLICATION

This application is the National Phase of PCT International Application No. PCT/KR2022/009968, filed on Jul. 8, 2022, which is hereby expressly incorporated by reference into the present application.

TECHNICAL FIELD

The present disclosure relates to an edge-to-cloud cooperation platform for providing signage, and more particularly, to a system and method for providing signage to a user through cooperation between an edge device and a cloud server based on edge data collected from the edge device.

BACKGROUND

Recently, due to the popularization of edge devices such as various Internet of Things (IoT) devices and the development of cloud computing technology, cloud services have been widely utilized in which edge data collected from an edge device is transmitted to a cloud server and the cloud server analyze the edge data.

In this cloud service, it may be insufficient at least in terms of cloud communication traffic and latency that the edge device transmits all edge data to the cloud server and the cloud server processes all edge data. When all edge data collected by the edge device is transmitted to the cloud server, private personal data may also be provided to the cloud server, which may raise privacy concerns.

To address these issues, edge computing technology may be used to analyze edge data by the edge device collecting the edge data or on a separate edge device, rather than transmitting edge data to the cloud server for data analysis.

However, in this case, a high-specification edge device needs to be utilized for smooth edge data processing, which may be inefficient in terms of cost.

In the case of edge devices such as vehicles, various sensors and devices have been installed in the vehicles and the functions of the vehicles have diversified to ensure the safety and convenience of users who use the vehicles. The functions of these vehicles may be divided into convenience functions to ensure the convenience of a driver, and safety functions to ensure the safety of the driver and/or pedestrians.

The convenience function of a vehicle may be related to driver convenience, such as providing infotainment (information+entertainment) functions to the vehicle, supporting partial autonomous driving functions, or helping secure a field of vision of the driver, such as night vision or blind spots.

For example, there are functions such as active cruise control (ACC), smart parking assist system (SPAS), night vision (NV), head up display (HUD), around view monitor (AVM), and adaptive headlight system (AHS).

Recently, technology development for augmented reality (AR) has been actively underway to output graphic objects through a windshield or head up display (HUD) of a vehicle or to output graphic objects to images captured by a camera, thereby additionally outputting graphic objects into a real world. In particular, the development of technologies that utilize augmented reality (AR) technology to guide drivers through paths or expose the drivers to various additional information or advertisements related to POIs on the path has expanded.

In the case of various guidance or advertisements using augmented reality (AR) technology, if they are not provided at an appropriate location and/or time, they may not only appear somewhat different from reality, but may even be a distraction to driving.

DISCLOSURE

Technical Problem

The present disclosure is proposed to resolve such problems, and is to provide a cooperation system and method between an edge and a cloud, in which the edge and the cloud may appropriately cooperate to efficiently provide signage to a user according to at least one of conditions of an edge device and the characteristics of edge data.

Technical Solution

The object of the present disclosure may be achieved by providing a method of providing data for a vehicle display device, the method including receiving driving context data from a vehicle, collecting signage-related information from an external data source, extracting first signage-related information corresponding to the vehicle from among the collected signage-related information based on the driving context data, determining a display policy for media content to be displayed in the vehicle based on the driving context data, determining a processing location of the first signage-related information based on the driving context data and the first signage-related information, and transmitting the first signage-related information based on the determined processing location.

The display policy may include a condition for filtering second signage-related information estimated to be preferred by a user from among the first signage-related information based on a profile of the user of the vehicle in the driving context data.

The method may further include, based on the processing location being determined as a cloud server, filtering second signage-related information from among the first signage-related information in the cloud server based on the display policy, and converting the second signage-related information into the media content by the cloud server.

The method may further include providing the second signage-related information to the vehicle or providing the media content to the vehicle.

Based on the processing location being determined solely as the cloud server, the media content may be provided to the vehicle, and based on the processing location being determined as the cloud server and the vehicle, the second signage-related information may be provided to the vehicle.

The method may further include, based on the processing location being determined as the vehicle, providing the first signage-related information to the vehicle.

The processing location may be determined based on a change possibility of the first signage-related information.

The processing location may be determined based on a data size of the first signage-related information.

The processing location may be determined based on an area of a signage displayable area according to the driving context data.

The processing location may be determined based on a communication situation with the vehicle.

The processing location may be determined based on driving stability of the vehicle according to the driving context data.

The method may further include receiving feedback from the vehicle on the media content displayed in the vehicle, wherein media content identical to the feedback-received media content is not provided to the vehicle.

The object of the present disclosure may be achieved by providing a vehicle display device for communicating with a cloud server, the vehicle display device including a driving context data manager configured to generate driving context data from edge data collected from a vehicle, an edge signage data processor including a signage data filtering module configured to filter second signage-related information from among first signage-related information based on the display policy upon receiving a display policy and first signage-related data from the cloud server, a rendering module configured to match the media content to a corresponding location of the media content upon receiving media content from the cloud server, and a display unit configured to display the media content together with a driving image to match the corresponding location.

The vehicle display device may further include an edge policy manager configured to determine a display policy separate from a display policy to be received from the cloud server based on the driving context data.

The edge policy manager may be configured to determine a condition for filtering second signage-related information estimated to be preferred by a user from among first signage-related information as the display policy based on a profile of the user of the vehicle in the driving context data.

The edge signage data processor may further include a media content processing module configured to convert second signage-related information into the media content.

The edge signage data processor may be configured to provide the converted media content to the rendering module to be displayed together with the driving image.

The vehicle display device may further include a memory configured to store the displayed media content, wherein the edge policy manager may be configured to feedback the stored media content to the cloud server.

The edge signage data processor may be configured to provide media content that complies with the display policy from among the stored media content to the rendering module, based on the vehicle repeatedly traveling in the same path.

The driving context data may include at least one of driving path related data, safe driving related data, computational resource amount information of the vehicle, signage displayable area information, communication environment information, user information, and a user profile.

Advantageous Effects

An effect of an edge and cloud cooperation platform for providing signage according to the present disclosure is described as follows.

According to at least one of the embodiments of the present disclosure, there is an advantage in that the edge and the cloud may efficiently provide signage to the user by appropriately cooperating according to at least one of conditions of the edge device and the characteristics of the edge data.

BRIEF DESCRIPTION OF THE DRAWINGS

FIG. 6 illustrates edge data and driving context data extracted therefrom according to an embodiment of the present disclosure.

FIG. 15 illustrates a driving image in which AR signage graphic data is displayed according to an embodiment of the present disclosure.

FIG. 17 illustrates a driving image in which AR signage graphic data is displayed according to an embodiment of the present disclosure.

FIG. 20 illustrates a driving image in which AR signage graphic data is displayed according to an embodiment of the present disclosure.

DETAILED DESCRIPTION

Figure 1:
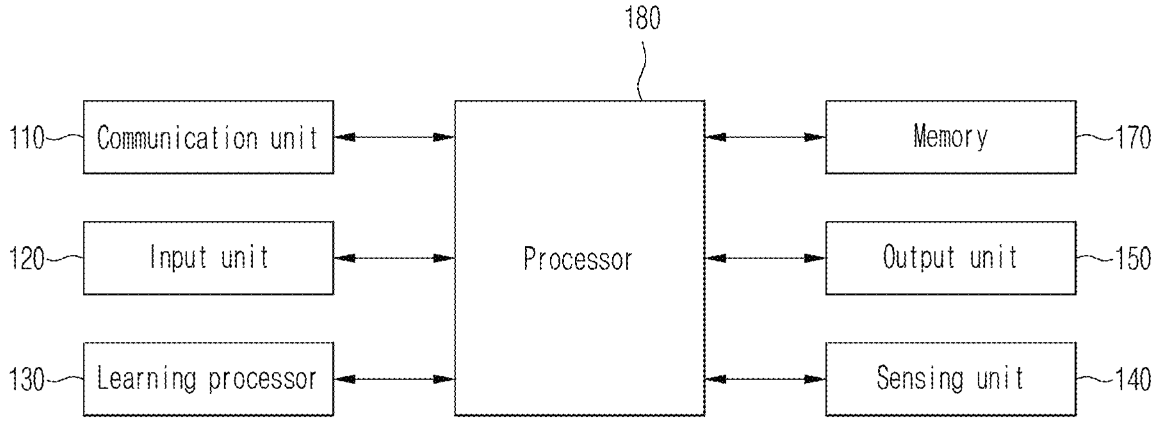
FIG. 1 illustrates an artificial intelligence (AI) device according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Each of these elements may be configured as a separate individual hardware module or implemented as two or more hardware modules. Two or more elements may be implemented as a single hardware module. In some cases, at least one of these elements may be implemented as software.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

In this disclosure, the expression "at least one of A or B" may mean "A", "B", or "A and B".

Hereinafter, artificial intelligence (AI) to be utilized in the present disclosure will be described.

Artificial Intelligence (AI) refers to a field that studies artificial intelligence or methodology capable of achieving artificial intelligence. Machine learning refers to a field that defines various problems handled in the AI field and studies methodology for solving the problems. Machine learning may also be defined as an algorithm for raising performance for any task through steady experience of the task.

An artificial neural network (ANN) may refer to a model in general having problem solving capabilities, that is composed of artificial neurons (nodes) constituting a network by a combination of synapses, as a model used in machine learning. The ANN may be defined by a connection pattern between neurons of different layers, a learning process of updating model parameters, and/or an activation function for generating an output value.

The ANN may include an input layer, an output layer, and, optionally, one or more hidden layers. Each layer includes one or more neurons and the ANN may include a synapse connecting neurons. In the ANN, each neuron may output input signals, which are input through the synapse, weights, and function values of an activation function for deflection.

A model parameter refers to a parameter determined through learning and includes a weight of synaptic connection and a deflection of a neuron. A hyperparameter refers to a parameter that should be configured before learning in a machine learning algorithm and includes a learning rate, the number of repetitions, a mini batch size, an initialization function, and the like.

The purpose of learning of the ANN may be understood as determining the model parameter that minimizes a loss function. The loss function may be used as an index to determine an optimal model parameter in a learning process of the ANN.

Machine learning may be classified into supervised learning, unsupervised learning, and reinforcement learning, according to a learning scheme.

Supervised learning refers to a method of training the ANN in a state in which a label for training data is given. The label may represent a correct answer (or result value) that the ANN should infer when the training data is input to the ANN. Unsupervised learning may refer to a method of training the ANN in a state in which the label for the training data is not given. Reinforcement learning may refer to a learning method in which an agent defined in a certain environment is trained to select a behavior or a behavior order that maximizes accumulative compensation in each state.

Among ANNs, machine learning implemented as a deep neural network (DNN) including a plurality of hidden layers is also called deep learning. Deep learning is a part of machine learning. Hereinbelow; machine learning includes deep learning.

An object detection model using machine learning includes a you only look once (YOLO) model of a single-step scheme, faster regions with convolution neural networks (R-CNN) model of a two-step scheme, and the like.

The you only look once (YOLO) model is a model in which an object existing in an image and a position of the corresponding object may be predicted as the image is viewed only once.

The you only look once (YOLO) model divides the original image into grids of the same size. Then, for each grid, the number of bounding boxes specified in a predefined form around a center of the grid is predicted, and reliability is calculated based on the predicted number.

Thereafter, whether the image contains the object or contains only a background may be included, and a location with high object reliability may be selected, so that an object category may be identified.

The faster regions with convolution neural networks (R-CNN) model is a model that may detect the object faster than an RCNN model and a Fast RCNN model.

The faster regions with convolution neural networks (R-CNN) model will be described in detail.

First, a feature map is extracted from the image via a convolution neural network (CNN) model. Based on the extracted feature map, a plurality of regions of interest (RoIs) are extracted. RoI pooling is performed for each region of interest.

The RoI pooling is a process of setting grids of a feature map to which the regions of interest are projected to fit a H×W size that is determined in advance and extracting the greatest value for each cell included in each grid to extract a feature map having the H×W size.

A feature vector may be extracted from the feature map having the H×W size, and identification information of the object may be obtained from the feature vector.

Hereinafter, with reference to FIG. 1, an AI device to be used as an edge device in the present disclosure will be described. FIG. 1 illustrates an AI device 100 according to an embodiment of the present disclosure.

The AI device 100 illustrated in FIG. 1 may be configured as a stationary device or a mobile device, such as a TV, a projector, a portable phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a digital signage, a robot, or a vehicle.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from an external device such as other AI devices 100*a* to 100*e* or an AI server 200 by wired or wireless communication. For example, the communication unit 110 may transmit and receive sensor information, a user input, a learning model, and a control signal to and from the external device.

Communication schemes used by the communication unit 110 include global system for mobile communication (GSM), CDMA, LTE, 5G, wireless local area network (WLAN), wireless fidelity (Wi-Fi), Bluetooth™, radio frequency identification (RFID), infrared data association (IrDA), ZigBee, near field communication (NFC), and so on.

The input unit 120 may acquire various types of data.

The input unit 120 may include a camera for inputting a video signal, a microphone for receiving an audio signal, and a user input unit for receiving information from a user. The camera or the microphone may be treated as a sensor, and thus a signal acquired from the camera or the microphone may be referred to as sensing data or sensor information.

The input unit 120 may acquire training data for model training and input data to be used to acquire an output by using a learning model. The input unit 120 may acquire raw input data. In this case, the processor 180 or the learning processor 130 may extract an input feature by preprocessing the input data.

The learning processor 130 may train a model composed of an ANN by using training data. The trained ANN may be referred to as a learning model. The learning model may be used to infer a result value for new input data, not training data, and the inferred value may be used as a basis for determination to perform a certain operation.

The learning processor 130 may perform AI processing together with a learning processor 240 of an AI server 200.

The learning processor 130 may include a memory integrated or implemented in the AI device 100. Alternatively, the learning processor 130 may be implemented by using the memory 170, an external memory directly connected to the AI device 100, or a memory maintained in an external device.

The sensing unit 140 may acquire at least one of internal information about the AI device 100, ambient environment information about the AI device 100, and user information by using various sensors.

The sensors included in the sensing unit 140 may include a proximity sensor, an illumination sensor, an accelerator sensor, a magnetic sensor, a gyro sensor, an inertial sensor, a red, green, blue (RGB) sensor, an IR sensor, a fingerprint recognition sensor, an ultrasonic sensor, an optical sensor, a microphone, a light detection and ranging (LiDAR), and a radar.

The output unit 150 may generate a visual, auditory, or haptic output.

Accordingly, the output unit 150 may include a display unit for outputting visual information, a speaker for outputting auditory information, and a haptic module for outputting haptic information.

The memory 170 may store data that supports various functions of the AI device 100. For example, the memory 170 may store input data acquired by the input unit 120, training data, a learning model, a learning history, and so on.

The processor 180 may determine at least one executable operation of the AI device 100 based on information determined or generated by a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute a predicted operation or an operation determined to be desirable among the at least one executable operation.

When the determined operation needs to be performed in conjunction with an external device, the processor 180 may generate a control signal for controlling the external device and transmit the generated control signal to the external device.

The processor 180 may acquire intention information with respect to a user input and determine the user's requirements based on the acquired intention information.

The processor 180 may acquire the intention information corresponding to the user input by using at least one of a speech to text (STT) engine for converting a speech input into a text string or a natural language processing (NLP) engine for acquiring intention information of a natural language.

At least one of the STT engine or the NLP engine may be configured as an ANN, at least part of which is trained according to the machine learning algorithm. At least one of the STT engine or the NLP engine may be trained by the learning processor, a learning processor of the AI server, or distributed processing of the learning processors.

The processor 180 may collect history information including the operation contents of the AI device 100 or the user's feedback on the operation and may store the collected history information in the memory 170 or the learning processor 130 or transmit the collected history information to the external device such as the AI server. The collected history information may be used to update the learning model.

The processor 180 may control at least a part of the components of AI device 100 so as to drive an application program stored in the memory 170. Furthermore, the processor 180 may operate two or more of the components included in the AI device 100 in combination so as to drive the application program.

Figure 2:
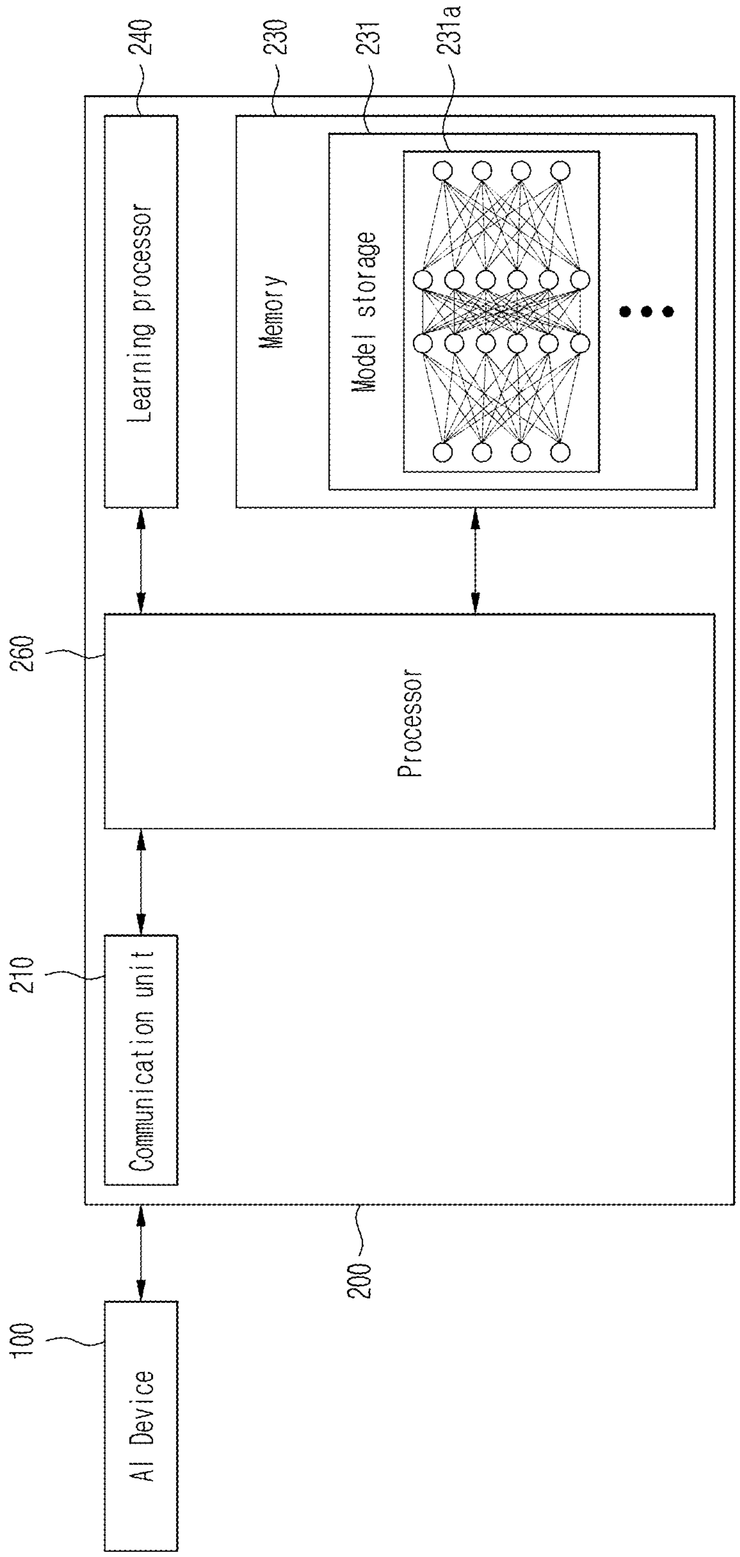
FIG. 2 illustrates an AI server according to an embodiment of the present disclosure.

Hereinafter, an AI server to be used as a cloud server in the present disclosure will be described. FIG. 2 illustrates an AI server 200 according to an embodiment of the present disclosure.

Referring to FIG. 2, the AI server 200 may refer to a device that trains an ANN by a machine learning algorithm or uses a trained ANN. The AI server 200 may include a plurality of servers to perform distributed processing, or may be defined as a 5G network. The AI server 200 may be included as part of the AI device 100, and perform at least part of the AI processing.

The AI server 200 may include a communication unit 210, a memory 230, a learning processor 240, a processor 260, and so on.

The communication unit 210 may transmit and receive data to and from an external device such as the AI device 100.

The memory 230 may include a model storage 231. The model storage 231 may store a model (or an ANN 231*a*) which has been trained or is being trained through the learning processor 240.

The learning processor 240 may train the ANN 231*a* by training data. The learning model may be used, while being loaded on the AI server 200 of the ANN, or on an external device such as the AI device 100.

The learning model may be implemented in hardware, software, or a combination of hardware and software. If all or part of the learning model is implemented in software, one or more instructions of the learning model may be stored in the memory 230.

The processor 260 may infer a result value for new input data by using the learning model and may generate a response or a control command based on the inferred result value.

Figure 3:
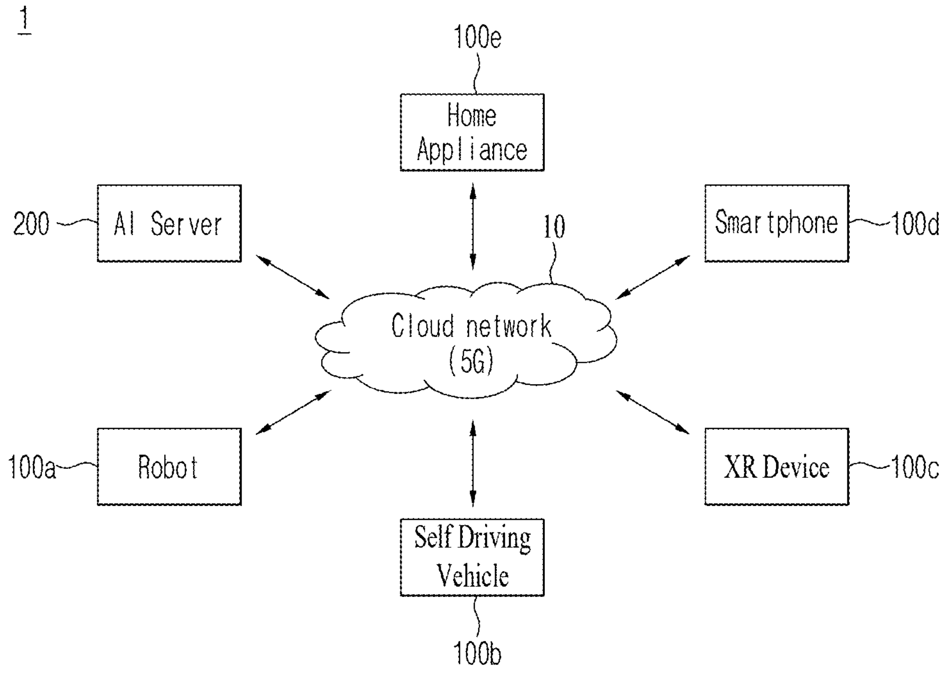
FIG. 3 illustrates an AI system according to an embodiment of the present disclosure.

Hereinafter, with reference to FIG. 3, an AI system I according to an embodiment of the present disclosure will be described. FIG. 3 illustrates the AI system 1 according to an embodiment of the present disclosure.

Referring to FIG. 3, the AI system I may be configured by connecting at least one of the AI server 200, a robot 100*a*, an autonomous vehicle 100*b*, an XR device 100*c*, a smartphone 100*d*, or a home appliance 100*e* to a cloud network 10. Here, the robot 100*a*, the autonomous vehicle 100*b*, the XR device 100*c*, the smartphone 100*d*, or the home appliance 100*e*, to which AI technology is applied, may be referred to as AI devices 100*a* to 100*e*.

The cloud network 10 may refer to a network that constitutes a part of a cloud computing infrastructure or exists within a cloud computing infrastructure. Here, the cloud network 10 may be configured using a 3G network, a 4G or long term evolution (LTE) network, or a 5G network.

That is, the devices 100*a* to 100*e* and 200 constituting the AI system I may be connected to each other through the cloud network 10. In particular, the devices 100*a* to 100*e* and 200 may communicate with each other through a base station, but may also communicate with each other directly without going through a base station.

The AI server 200 may include a server that performs AI processing and a server that performs operations on big data.

The AI server 200 may be connected to at least one of AI devices constituting the AI system 1, such as the robot 100*a*, the autonomous vehicle 100*b*, the XR device 100*c*, the smartphone 100*d*, or the home appliance 100*e*, through the cloud network 10 and may assist at least a part of the AI processing of the connected AI devices 100*a* to 100*e*.

In this case, the AI server 200 may train an ANN according to a machine learning algorithm on behalf of the AI devices 100*a* to 100*e* and may directly store the learning model or transmit the learning model to the AI devices 100*a* to 100*e*.

In this case, the AI server 200 may receive input data from the AI devices 100*a* to 100*e*, infer a result value for the received input data by using the learning model, and generate a response or control command based on the inferred result value and transmit the response or control command to the AI devices 100*a* to 100*e*.

Alternatively, the AI devices 100*a* to 100*e* may directly infer a result value for input data by using a learning model and generate a response or control command based on the inferred result value.

Hereinafter, various embodiments of the AI devices 100*a* to 100*e* to which the technology described above is applied are described. Here, the AI devices 100*a* to 100*e* shown in FIG. 3 may be considered as specific examples of the AI device 100 illustrated in FIG. 1.

The robot 100*a* may be implemented as a guide robot, a transport robot, a cleaning robot, a wearable robot, an entertainment robot, a pet robot, an unmanned flying robot, or the like by applying AI technology.

The robot 100*a* may include a robot control module for controlling movement, and the robot control module may mean a software module or a chip implementing the same as hardware.

The robot 100*a* may obtain status information of the robot 100*a*, detect (recognize) an ambient environment and objects, generate map data, determine a movement path and driving plan, determine a response to user interaction, or determine an operation by using sensor information obtained from various types of sensors.

Here, the robot 100*a* may use sensor information obtained from at least one sensor from among lidar, radar, and camera to determine the movement path and the driving plan.

The robot 100*a* may perform the operations described above by using a learning model including at least one ANN. For example, the robot 100*a* may recognize the ambient environment and objects by using the learning model and determine operations by using the recognized ambient environment information or object information. Here, the learning model may be learned directly from the robot 100*a* or from the external device such as the AI server 200.

In this case, the robot 100*a* may directly generate a result by using the learning model to perform an operation but may perform the operation by transmitting sensor information to the external device such as the AI server 200 and receiving the result generated accordingly.

The robot 100*a* may determine a movement path and a driving plan by using at least one of map data, object information detected from sensor information, or object information obtained from an external device, and control a driving unit to drive the robot 100*a* according to the determined movement path and driving plan.

The map data may include object identification information for various objects located in a space in which the robot 100*a* moves. For example, map data may include object identification information for fixed objects such as walls and doors, as well as movable objects such as flower pots and desks. The object identification information may include a name, a type, a distance, or a location.

The robot 100*a* may control the driving unit based on control/interaction of a user. In this case, the robot 100*a* may obtain intention information of interaction according to movement or voice utterance of the user and determine a response based on the obtained intention information to perform an operation.

The autonomous vehicle 100*b* may be implemented as mobile robots, vehicles, unmanned aerial vehicles, or the like by applying AI technology.

The autonomous vehicle 100*b* may include an autonomous driving control module for controlling an autonomous driving function, and the autonomous driving control module may mean a software module or a chip that implements the same as hardware. The autonomous driving control module may be included internally as a component of the autonomous vehicle 100_b_ but may also be configured as separate hardware and connected to the outside of the autonomous vehicle 100_b_.

The autonomous vehicle 100_b_ may obtain status information of the autonomous vehicle 100_b_, detect (recognize) an ambient environment and objects, generate map data, determine a movement path and driving plan, or determine an operation by using sensor information obtained from various types of sensors.

Here, the autonomous vehicle 100_b_ may use sensor information obtained from at least one sensor from among lidar, radar, and camera, similar to the robot 100_a_, to determine a movement path and a driving plan.

In particular, the autonomous vehicle 100_b_ may recognize the environment or objects in an area in which a field of vision is hidden or an area greater than a certain distance by receiving sensor information from external devices or may receive information recognized directly from external devices.

The autonomous vehicle 100_b_ may perform the operations described above by using a learning model including at least one ANN. For example, the autonomous vehicle 100_b_ may recognize the ambient environment and objects by using the learning model and determine a driving path by using the recognized ambient environment information or object information. Here, the learning model may be learned directly from the autonomous vehicle 100_b_ or from the external device such as the AI server 200.

In this case, the autonomous vehicle 100_b_ may directly generate a result by using the learning model to perform an operation but may perform the operation by transmitting sensor information to the external device such as the AI server 200 and receiving the result generated accordingly.

The autonomous vehicle 100_b_ may determine a movement path and a driving plan by using at least one of map data, object information detected from sensor information, or object information obtained from an external device, and control a driving to drive the autonomous vehicle 100_b_ according to the determined movement path and driving plan.

The map data may include object identification information for various objects located in a space in which the autonomous vehicle 100_b_ moves. For example, map data may include object identification information for fixed objects such as streetlights, rocks, and buildings, as well as movable objects such as vehicles and pedestrians. The object identification information may include a name, a type, a distance, or a location.

The autonomous vehicle 100_b_ may control the driving based on control/interaction of a user. In this case, the autonomous vehicle 100_b_ may obtain intention information of interaction according to movement or voice utterance of the user and determine a response based on the obtained intention information to perform an operation.

The XR device 100_c_ may be implemented as a head-mount display (HMD), a head-up display (HUD) installed in a vehicle, a television, a mobile phone, a smart phone, a computer, a wearable device, a home appliance, digital signage, a vehicle, a fixed robot, a mobile robot, or the like by applying AI technology.

The XR device 100_c_ may obtain information about a surrounding space or real objects by analyzing 3D point cloud data or image data obtained through various sensors or from an external device to generate location data and attribute data for 3D points and may render and output an XR object to be output. For example, the XR device 100_c_ may output an XR object containing additional information about the recognized object corresponding to the recognized object.

The XR device 100_c_ may perform the operations described above by using a learning model including at least one ANN. For example, the XR device 100_c_ may recognize a real object from 3D point cloud data or image data by using a learning model and provide information corresponding to the recognized real object. Here, the learning model may be learned directly from the XR device 100_c_ or from the external device such as the AI server 200.

In this case, the XR device 100_c_ may directly generate a result by using the learning model to perform an operation but may perform the operation by transmitting sensor information to the external device such as the AI server 200 and receiving the result generated accordingly.

The robot 100_a_ may be implemented as a guide robot, a transport robot, a cleaning robot, a wearable robot, an entertainment robot, a pet robot, an unmanned flying robot, or the like by applying AI technology and autonomous driving technology.

The robot 100_a_ to which AI technology and autonomous driving technology are applied may refer to a robot itself with an autonomous driving function, or the robot 100_a_ that interacts with the autonomous vehicle 100_b_.

The robot 100_a_ with the autonomous driving function may a general term for devices that autonomously move along a given path without user control or move by autonomously determining the path.

The robot 100_a_ with the autonomous driving function and the autonomous vehicle 100_b_ may use a common sensing method to determine one or more of a movement path or a driving plan. For example, the robot 100_a_ with the autonomous driving function and the autonomous vehicle 100_b_ may determine one or more of a movement path or a driving plan by using information sensed through a lidar, radar, and camera.

The robot 100_a_ interacting with the autonomous vehicle 100_b_ may exist separately from the autonomous vehicle 100_b_, and may be linked to the autonomous driving function within the autonomous vehicle 100_b_ or perform an operation linked to a user riding in the autonomous vehicle 100_b_.

In this case, the robot 100_a_ interacting with the autonomous vehicle 100_b_ may control or assist the autonomous driving function of the autonomous vehicle 100_b_ by obtaining sensor information on behalf of the autonomous vehicle 100_b_ and providing the sensor information to the autonomous vehicle 100_b_ or by obtaining the sensor information and generating ambient environment information or object information and providing the generated information to the autonomous vehicle 100_b_.

Alternatively, the robot 100_a_ interacting with the autonomous vehicle 100_b_ may monitor a user riding in the autonomous vehicle 100_b_ or control a function of the autonomous vehicle 100_b_ through an interaction with the user. For example, when the robot 100_a_ determines that a driver is drowsy, the robot 100_a_ may activate the autonomous driving function of the autonomous vehicle 100_b_ or assist in controlling the driving unit of the autonomous vehicle 100_b_. Here, the function of the autonomous vehicle 100_b_ controlled by the robot 100_a_ may include not only a simple autonomous driving function, but also a function provided by a navigation system or audio system equipped inside the autonomous vehicle 100_b_.

Alternatively, the robot 100_a_ interacting with the autonomous vehicle 100_b_ may provide information to the autonomous vehicle 100_b_ or assist functions from outside the autonomous vehicle 100_b_. For example, the robot 100_a_ may provide traffic information including signal information to the autonomous vehicle 100_b_, such as a smart traffic light, or may interact with the autonomous vehicle 100_b_ to automatically connect an electric charger to a charging port, such as an automatic electric charger for an electric vehicle.

The robot 100_a_ may be implemented as a guide robot, a transport robot, a cleaning robot, a wearable robot, an entertainment robot, a pet robot, an unmanned flying robot, a drone, or the like by applying AI technology and XR technology.

The robot 100_a_ to which XR technology is applied may refer to a robot that is a target of control/interaction within an XR image. In this case, the robot 100_a_ is separated from the XR device 100_c_ and may be operatively connected thereto.

When the robot 100_a_ that is a target of control/interaction within an XR image obtains sensor information from sensors including a camera, the robot 100_a_ or the XR device 100_c_ may generate an XR image based on the sensor information, and the XR device 100_c_ may output the generated XR image. The robot 100_a_ may operate based on control signals input through the XR device 100_c_ or user interaction.

For example, a user may check an XR image corresponding to a viewpoint of a remotely connected robot 100_a_ through an external device such as the XR device 100_c_, and through an interaction, adjust an autonomous driving path of the robot 100_a_, control the operation or driving, or check information on surrounding objects.

The autonomous vehicle 100_b_ may be implemented as mobile robots, vehicles, unmanned aerial vehicles, or the like by applying AI technology and XR technology.

The autonomous vehicle 100_b_ to which XR technology is applied may refer to an autonomous vehicle equipped with a device for providing XR images, an autonomous vehicle that is a target of control/interaction within an XR image, or the like. In particular, the autonomous vehicle 100_b_ that is a target of control/interaction within the XR image is distinct from the XR device 100_c_ and may be linked therewith.

The autonomous vehicle 100_b_ including a device for providing XR images may obtain sensor information from sensors including a camera and output an XR image generated based on the obtained sensor information. For example, the autonomous vehicle 100_b_ may include an HUD to output an XR image, thereby providing passengers with an XR object corresponding to a real object or an object on a screen.

In this case, when an XR object is output to the HUD, at least a portion of the XR object may be output to overlap the real object toward which a gaze of the passenger is directed. On the other hand, when the XR object is output to a display inside an autonomous vehicle 100_b_, at least a part of the XR object may be output to overlap an object on the screen. For example, the autonomous vehicle 100_b_ may output XR objects corresponding to objects such as a lane, another vehicle, a traffic light, a traffic sign, a two-wheeled vehicle, a pedestrian, or a building.

When the autonomous vehicle 100_b_ that is a target of control/interaction within an XR image obtains sensor information from sensors including a camera, the autonomous vehicle 100_b_ or the XR device 100_c_ may generate an XR image based on the sensor information, and the XR device 100_c_ may output the generated XR image. The autonomous vehicle 100_b_ may operate based on control signals input through an external device such as the XR device 100_c_ or user interaction.

Figure 4:
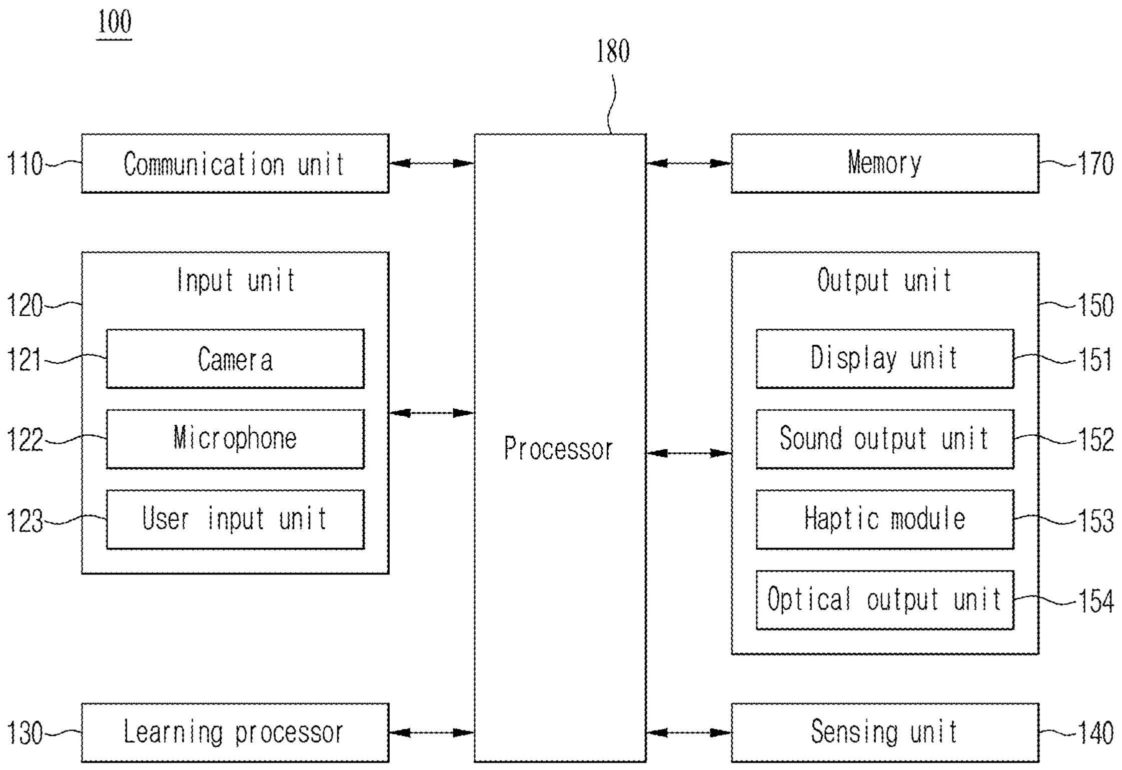
FIG. 4 illustrates an AI device according to an embodiment of the present disclosure.

FIG. 4 illustrates the AI device 100 according to an embodiment of the present disclosure.

A repeated description with FIG. 1 is omitted.

Referring to FIG. 4, the input unit 120 may include a camera 121 for inputting an image signal, a microphone 122 for receiving an audio signal, and a user input unit 123 for receiving information from a user.

Voice data or image data collected from the input unit 120 may be analyzed and processed as a control command of the user.

The input unit 120 is to input image information (or signal), audio information (or signal), data, or information input from the user, and to input the image information, the AI device 100 may include one or more cameras 121.

The camera 121 processes image frames, such as still images or moving images, obtained by the image sensor in video call mode or shooting mode. The processed image frame may be displayed in a display unit 151 or stored in the memory 170.

The microphone 122 processes external acoustic signals into electrical voice data. The processed voice data may be utilized in various ways depending on a function being performed (or an application being executed) by the AI device 100. Various noise removal algorithms may be applied to the microphone 122 to remove noise generated in a process of receiving the external acoustic signal.

The user input unit 123 is to receive information from a user. When information is input through the user input unit 123, the processor 180 may control an operation of the AI device 100 to correspond to the input information.

The user input unit 123 may include a mechanical input device (or a mechanical key, for example, a button located on a front/rear surface or lateral surface of a terminal 100, a dome switch, a jog wheel, or a jog switch) and a touch input device. For example, the touch input device may include a virtual key, a soft key, or a visual key displayed on a touch screen through software processing or may include a touch key located on a portion other than the touch screen.

The output unit 150 may include at least one of a display unit 151, a sound output unit 152, a haptic module 153, or an optical output unit 154.

The display unit 151 displays (outputs) information processed in the AI device 100. For example, the display unit 151 may display execution screen information of an application program executed in the AI device 100, or user interface (UI) or graphic user interface (GUI) information according to such execution screen information.

The display unit 151 may implement a touch screen by forming a mutual layer structure with the touch sensor or integrally forming the display unit 151 with the touch screen. The touch screen may function as the user input unit 123 that provides an input interface between the AI device 100 and the user while also providing an output interface between the terminal 100 and the user.

The sound output unit 152 may output audio data received from the communication unit 110 or stored in the memory 170 in a call signal reception mode, a call mode, a recording mode, a voice recognition mode, a broadcast reception mode, or the like.

The sound output unit 152 may include at least one of a receiver, a speaker, or a buzzer.

The haptic module 153 generates various tactile effects that the user feels. A representative example of the tactile effect generated by the haptic module 153 may include vibration.

The optical output unit 154 outputs a signal to notify occurrence of an event by using light from a light source of the AI device 100. Examples of events occurring in the AI device 100 may include receiving a message, receiving a call signal, receiving a missed call, an alarm, a schedule notification, receiving an email, and receiving information through an application. In the following description, it may be assumed that the edge device 100 is a vehicle or a vehicle display device that is to be mounted on the vehicle.

At least one sensor provided in the sensing unit 140 of the vehicle 100 may collect various data related to the vehicle 100. Data related to the vehicle 100 collected by at least one sensor may be understood as edge data.

The sensing unit 140 may include at least one of a location search unit (not shown), a vehicle status collection unit (not shown), and a vehicle interior/exterior situation collection unit (not shown).

The location search unit may search for the current location of the vehicle 100 and provide information about the current location to the processor 180 of the vehicle.

Here, the location search unit may search the current location of the vehicle through any one of satellite navigation and dead reckoning navigation.

In this case, the satellite navigation measures the location information of the vehicle based on global navigation satellite system (GNSS), and may search for the current location by receiving location information from systems such as global positioning system (GPS), global navigation satellite system (GLONASS), Galileo, and Beidou.

The dead reckoning navigation may measure the location information of the vehicle based on a vehicle speed and dead reckoning (DR) information of the vehicle, which are obtained from a speedometer (not shown), gyroscope sensor (not shown), and geomagnetic sensor (not shown) of the vehicle, and search for the current location.

The vehicle status collection unit may collect a driving status of the vehicle and provide the collected information to the processor 180 of the vehicle.

For example, the posture, steering status, braking status, acceleration status, and driving status of the vehicle may be collected and provided.

The vehicle interior/exterior situation collection unit may collect data on the exterior and interior situations of the vehicle and provide the data to the processor 180 of the vehicle.

Here, the vehicle interior/exterior situation collection unit may include at least one of a camera (e.g., a vehicle exterior camera (i.e., a front camera, a left-side camera, a right-side camera, or a rear-view camera) and a vehicle interior camera (a driver camera or a passenger camera), a radar, and a lidar and detect all surrounding situations necessary for autonomous driving, such as lanes, traffic lights, surrounding vehicles, pedestrians, obstacles, and passengers.

Although not shown in FIG. 4, the vehicle 100 may include a navigation system.

The navigation system may provide navigation information to assist driving of the vehicle (100). The navigation information may include at least one of map information, set destination information, path information according to the set destination, information on various objects on the path, lane information, and current location information of the vehicle.

The navigation system may include a separate memory for storing navigation information and a dedicated processor for controlling an operation of the navigation system.

The navigation system may receive information from an external device through the communication unit 110 and update previously stored information.

The navigation system may be linked with the user input unit 123 to receive commands or information from a user.

Figure 5:
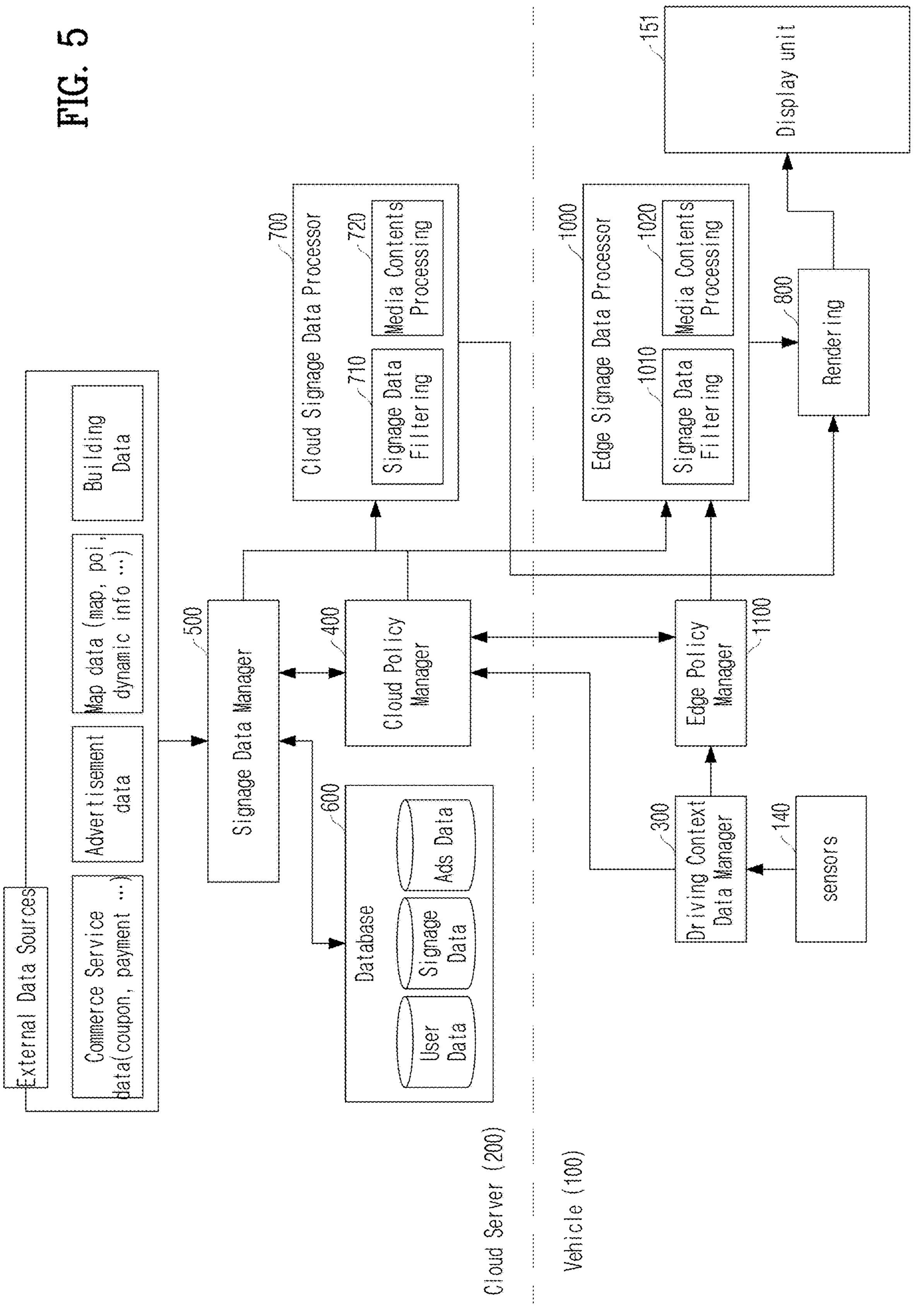
FIG. 5 is a block diagram of a cooperation system between an edge device and a cloud server in terms of software according to an embodiment of the present disclosure.

Hereinafter, with reference to FIG. 5, a system for cooperation between an edge device and a cloud server according to an embodiment of the present disclosure will be described in terms of software. FIG. 5 is a block diagram of a cooperation system between an edge device (e.g., a vehicle) and a cloud server in terms of software, according to an embodiment of the present disclosure.

Various edge data collected from the vehicle 100 may be transmitted to a driving context data manager 300. The edge data may be collected while the vehicle 100 travels or may be collected when the vehicle 100 is stopped. The transmission may be performed in real time as the edge data is collected. That is, when the edge data is collected from the vehicle 100, the edge data may be virtually immediately transmitted to the driving context data manager 300. The edge data refers to data to be collected from an edge device such as the vehicle 100, examples of which are as follows. However, the present disclosure is not limited thereto.

The edge data may be data to be collected by the location search unit, the vehicle status collection unit, and the vehicle interior/exterior situation collection unit.

For example, the edge data may include an external camera image (e.g., a driving image) input in real time through a vision sensor such as an external camera of the vehicle 100. Information about surrounding buildings may be obtained through the external camera image.

The edge data may include information about the topography and/or features of a road on which the vehicle 100 travels, such as the type of road (e.g., highway, national road, or back road), the number and width of lanes, and the presence of building coordinate information, based on map information loaded in the navigation system.

The edge data may include data on the exterior and interior situations of the vehicle collected through the vehicle status collection unit while the vehicle 100 travels. For example, there may be sensed driving direction and speed, distance from surrounding vehicles, vehicle posture, and the like.

The sensing unit 140 may include an ADAS sensor, and the edge data may include driving-related sensing data such as driving direction and speed, distance from lane, and the like, which are obtained through the ADAS sensor 360, as well as data on obstacles or pedestrians around the vehicle.

The communication unit 110 may include a V2X communication unit, and the edge data may include vehicle traffic related data collected through the V2X communication unit.

The edge data may include personal profile information of a user (e.g., driver and/or passenger) of the vehicle 100.

The driving context data manager 300 may extract or generate driving context data from the edge data. The driving context data may include at least one of driving path related data, safe driving related data, and computational resource amount of the vehicle 100. The driving context data is converted from the edge data by the driving context data manager 300 provided in the vehicle 100, and thus the driving context data may also be understood as a type of edge data. Based on the driving context information, at least one of a signage displayable area, a maximum number of signage displays, and a signage exposure time may be determined. The edge data and the extraction or conversion of the driving context data therefrom will be described again later with reference to FIG. 6.

The driving context data manager 300 may transmit the driving context data to a cloud policy manager 400. The cloud policy manager 400 is implemented in a cloud server 200 and its operation will be described later.

A signage data manager 500 implemented in the cloud server 200 may collate or collect various signage-related information from at least one external data source and store the collated signage-related information in a database 600 provided in the cloud server 200. The stored signage-related information may be updated periodically/aperiodically as the signage data manager 500 continuously collects new information from the external data source. The external data source may be, for example, an external server.

The signage-related information may include signage display information such as (but not limited to) transaction service data such as coupons and payments, and advertising-related data. The signage-related information may include location information for displaying the signage display information, such as map-related data and building and related topographic feature data, i.e., signage location information. The signage-related information may include digital signage information. The digital signage information may include augmented reality (AR) information.

The signage data manager 500 may receive the driving context data from the cloud policy manager 400 and store the received data in the database 600. All of the driving context data may be stored in the database 600, and user profiles from among the driving context data may be selectively stored in the database 600.

The signage data manager 500 may extract signage-related information appropriate for the vehicle 100 from the collected signage-related information based on the driving context data according to whether a subject location corresponds to the current location and/or expected movement path of the vehicle 100, and the like. Hereinafter, the signage-related information extracted by the signage data manager 500 may also be referred to as first signage-related information. The signage data manager 500 may store the first signage-related information in the database 600.

In the database 600, various signage-related information and first signage-related information collected from the external data source may be stored and managed in separate areas, each classified for each data characteristic.

The cloud policy manager 400 may determine whether the extracted signage-related information is appropriately processed in the vehicle 100 and the cloud server 200, i.e., the processing location, based on at least one of the driving context data and the extracted signage-related information (i.e., the first signage-related information). The "processing" at the above processing location may mean data processing to convert the first signage-related information into media content to be ultimately displayed on the vehicle 100.

Determining the processing location may be understood as inferring a proper method of distributing the first signage-related information between the cloud server 200 and the edge device, and to this end, the cloud policy manager 400 may be equipped with an artificial intelligence model for the inference. That is, the extracted signage-related information and the driving context data may be input data for inference for the artificial intelligence model, and the first signage-related information may be output as an inference result through the artificial intelligence model.

For example, the cloud policy manager 400 may determine that the signage-related information is processed only by the vehicle 100. In this case, the processing location may correspond to the vehicle 100.

The cloud policy manager 400 may determine that the signage-related information is processed only by the cloud server 200. In this case, the processing location may correspond to the cloud server 200.

The cloud policy manager 400 may also determine that the signage-related information is processed cooperatively by both the vehicle 100 and the cloud server 200. In this case, the processing location may correspond to the vehicle 100 and the cloud server 200.

The logic by which the processing location is determined will be described again later.

In addition to determining the processing location, the cloud policy manager 400 may derive a display policy for signage data (i.e., media content described below) to be displayed through the vehicle 100 based on the driving context data (particularly, a profile of the user). The display policy of the signage data may be understood as a condition or inference input data for filtering signage-related information (i.e., second signage-related information) that is deemed to be of interest to the user from among the signage-related information (i.e., first signage-related information).

When deriving the display policy, the cloud policy manager 400 may consider not only the driving context data of the vehicle 100, but also the driving context data of another vehicle moving close to the vehicle 100.

The processing location and display policy determined by the cloud policy manager 400 will be described in more detail.

When the processing location is determined as the cloud server 200 by the cloud policy manager 400, the cloud policy manager 400 may transmit a control signal notifying that the processing location is determined as the cloud server 200 to the signage data manager 500 and a cloud signage data processor 700 provided in the cloud server 200.

In response to the control signal, the signage data manager 500 may transmit the extracted first signage-related information to the cloud signage data processor 700.

The cloud policy manager 400 may transmit the display policy to the cloud signage data processor 700.

The cloud signage data processor 700 may include a signage data filtering module 710 and a media content processing module 720.

The signage data filtering module 710 may filter second signage-related information that is inferred to be of interest to the user from among first signage-related information based on the display policy. The signage data filtering module 710 may be equipped with an artificial intelligence model for inferring the second signage-related information. That is, the display policy and the first signage-related information may be input data for inference for the artificial intelligence model, and the second signage-related information may be output as an inference result through the artificial intelligence model.

The media content processing module 720 may convert the filtered second signage-related information into media content such as AR graphic data and tag the converted media content with display location information regarding a location in which the converted media content is to be displayed. For example, from among the second signage-related information, the signage display information may be converted into the AR graphic data, and in this case, the signage display information may be converted to match the topography or feature, such as a building, on which the AR graphic data is to be displayed, taking into consideration the signage location information.

The cloud signage data processor 700 may transmit the media content tagged with the display location information to a rendering module 800 provided in the vehicle 100.

The rendering module 800 may match the media content to the corresponding location or the corresponding topography or object when the vehicle 100 is determined to approach the corresponding location of the media content within a predetermined distance or when the corresponding topography or feature is recognized through the driving image.

The media content may be displayed through a display unit 151 together with the driving image to match the corresponding location or the corresponding topography or feature.

The display unit 151 may include at least one of a center information display (CID), a cluster, a head-up display (HUD), a rear seat entertainment (RSE), and a room mirror display (RMD) in the vehicle 100.

When the processing location is determined as the vehicle 1000 by the cloud policy manager 400, the cloud policy manager 400 may transmit a control signal notifying that the processing location is determined as the vehicle 100 to the signage data manager 500 and an edge signage data processor 1000 provided in the vehicle 100.

In response to the control signal, the signage data manager 500 may transmit the extracted first signage-related information to the edge signage data processor 1000.

The cloud policy manager 400 may transmit the display policy to the edge signage data processor 1000.

The edge signage data processor 1000 may, similarly to the cloud signage data processor 700, include a signage data filtering module 1010 and a media content processing module 1020.

The signage data filtering module 1010 may filter second signage-related information that is inferred to be of interest to the user from among first signage-related information based on the display policy: The signage data filtering module 1010 may be equipped with an artificial intelligence model for inferring the second signage-related information. That is, the display policy and the first signage-related information may be input data for inference for the artificial intelligence model, and the second signage-related information may be output as an inference result through the artificial intelligence model.

The media content processing module 1020 may convert the filtered second signage-related information into media content such as AR graphic data and tag the converted media content with display location information regarding a location in which the converted media content is to be displayed. For example, from among the second signage-related information, the signage display information may be converted into the AR graphic data, and in this case, the signage display information may be converted to match the topography or feature, such as a building, on which the AR graphic data is to be displayed, taking into consideration the signage location information.

The edge signage data processor 1000 may transmit the media content tagged with the display location information to the rendering module 800.

The rendering module 800 may match the media content to the corresponding location or the corresponding topography or object when the vehicle 100 is determined to approach the corresponding location of the media content within a predetermined distance or when the corresponding topography or feature is recognized through the driving image.

The media content may be displayed through a display unit 151 together with the driving image to match the corresponding location or the corresponding topography or feature.

The processing location may be determined as the vehicle 100 and the cloud server 200 by the cloud policy manager 400. In this case, the cloud policy manager 400 may transmit a control signal notifying that the processing location has been determined as the vehicle 100 and the cloud server 200 to the signage data manager 500, the cloud signage data processor 700, and the edge signage data processor 1000.

In response to the control signal, the signage data manager 500 may transmit the extracted first signage-related information to the cloud signage data processor 700.

The cloud policy manager 400 may transmit the display policy to the cloud signage data processor 700.

The signage data filtering module 710 of the cloud signage data processor 700 may filter second signage-related information that is inferred to be of interest to the user from among the first signage-related information based on the display policy.

The cloud signage data processor 700 may transmit the filtered second signage-related information to the edge signage data processor 1000.

The media content processing module 1020 of the edge signage data processor 1000 may convert the filtered second signage-related information into media content such as AR graphic data and tag the converted media content with display location information regarding the location in which the media content is to be displayed. For example, from among the second signage-related information, the signage display information may be converted into the AR graphic data, and in this case, the signage display information may be converted to match the topography or feature, such as a building, on which the AR graphic data is to be displayed, taking into consideration the signage location information.

The media content processing module 1020 of the edge signage data processor 1000 may transmit the media content tagged with the display location information to the rendering module 800.

The rendering module 800 may match the media content to the corresponding location or the corresponding topography or object when the vehicle 100 is determined to approach the corresponding location of the media content within a predetermined distance or when the corresponding topography or feature is recognized through the driving image.

The media content may be displayed through the display unit 151 together with the driving image to match the corresponding location or the corresponding topography or feature.

The vehicle 100 may further include an edge policy manager 1100. The edge policy manager 1100 may have a similar role to the cloud policy manager 400, and for example, when the vehicle 100 does not communicate smoothly with the cloud server 200 or when the vehicle 100 repeatedly drives the same path, the edge policy manager 1100 may perform the function of the cloud policy manager 400.

For example, when the vehicle 100 does not communicate smoothly with the cloud server 200, or when the vehicle 100 repeatedly drives the same path, the driving context data manager 300 may transmit a control signal to the edge policy manager 1100 to cause the edge policy manager 1100 to perform the function of the cloud policy manager 400.

In response to the control signal, the edge policy manager 1100 may transmit the driving context data received from the driving context data manager 300 and the second signage-related information or the media content stored in the memory 170 (for example, but not limited to, a cache memory) within the vehicle 100 to the edge signage data processor 1000. Alternatively, the edge policy manager 1100 may control the edge signage data processor 1000 to directly access the memory 170 and to read out the second signage-related information.

The edge policy manager 1100 may derive a display policy for signage data to be displayed through the vehicle 100 based on the driving context data (particularly, a profile of the user) and transmit the derived display policy to the signage data processor 1000.

When utilizing the second signage-related information stored in the memory 170, the signage data processor 1000 may convert the second signage-related information that complies with the display policy into media content and transmit the converted media content to the rendering module 800. Alternatively, when utilizing the second signage-related information stored in the memory 170, the signage data processor 1000 may transmit media content that complies with the display policy to the rendering module 800. The media content transmitted to the above rendering module 800 is tagged with the display location information.

The rendering module 800 may match the media content to the corresponding location or the corresponding topography or object when the vehicle 100 is determined to approach the corresponding location of the media content within a predetermined distance or when the corresponding topography or feature is recognized through the driving image.

The media content may be displayed through the display unit 151 together with the driving image to match the corresponding location or the corresponding topography or feature.

The edge policy manager 1100, the edge signage data processor 1000, the rendering module 800, and the display unit 151 may be understood to constitute the vehicle display device equipped in the vehicle 100. The driving context data manager 300 may or may not be understood as a component belonging to the vehicle display device.

Hereinafter, with further reference to FIG. 6, the driving context data will be described in more detail. FIG. 6 illustrates edge data and driving context data extracted therefrom according to an embodiment of the present disclosure.

The edge data for extracting the driving context data by the driving context data manager 300 may be as follows.

First, user information may be utilized as the edge data. The user information may include personal information registered for subscription to a service of the present disclosure, such as the gender, age, and place of residence of the user.

Map or navigation guidance information may be utilized as the edge data. The map or navigation guidance information may include i) destination and/or waypoint information, ii) navigation path information to the destination and/or waypoint, iii) turn-by-turn guidance information of the destination and/or waypoint, iv) at least one map information and attributes thereof, and v) road information within the map (e.g., type/attribute, road and lane width, curvature, slope, or speed limit).

Dynamic (or real-time) information may be utilized as the edge data. The dynamic information may include i) traffic information (road-level traffic information and lane-level traffic information), ii) event information such as accidents and hazard warnings, iii) weather information, and iv) coupon information used or available around the current location (including coupon information of other users), iv) communication environment situation information (e.g., communication traffic and/or availability of communication with other vehicles or cloud servers).

Vehicle sensor information may be utilized as the edge data. The vehicle sensor information may include i) current location information (including GPS information and deduced reckoning (DR)-GPS information), ii) camera input information (including ADAS information and object recognition information), iii) V2X information (including real-time surrounding situation information to be collected through V2V and V2I), and iv) remaining fuel or charging amount and information on when to replace consumables.

A user profile may be utilized as the edge data. The user profile may include the i) past/recent driving path, ii) information on preferred brand and interest category registered by the user (e.g. registered hashtag), iii) past/recent destination, waypoint, search location, and registration point, iv) information on major activity hub area, and v) information on downloaded coupon usage history.

Other driving-related information may be utilized as the edge data. The other driving-related information may include i) driving mode (manual, autonomous driving, semi-autonomous driving, operation of ADAS function, or the like), and ii) electronic horizon information (forward driving path information).

The driving context data that the driving context data manager 300 is capable of extracting from the edge data may include at least one of i) driving path related data such as an expected driving path and a location and/or information on which signage is to be displayed on the path, ii) safe driving-related data such as a safety rating for a driving section, iii) computational resource amount information such as resource information to be computed and processed in real time in the vehicle 100, iv) signage displayable area information, v) communication environment information, and vi) user information and profile.

Figure 7:
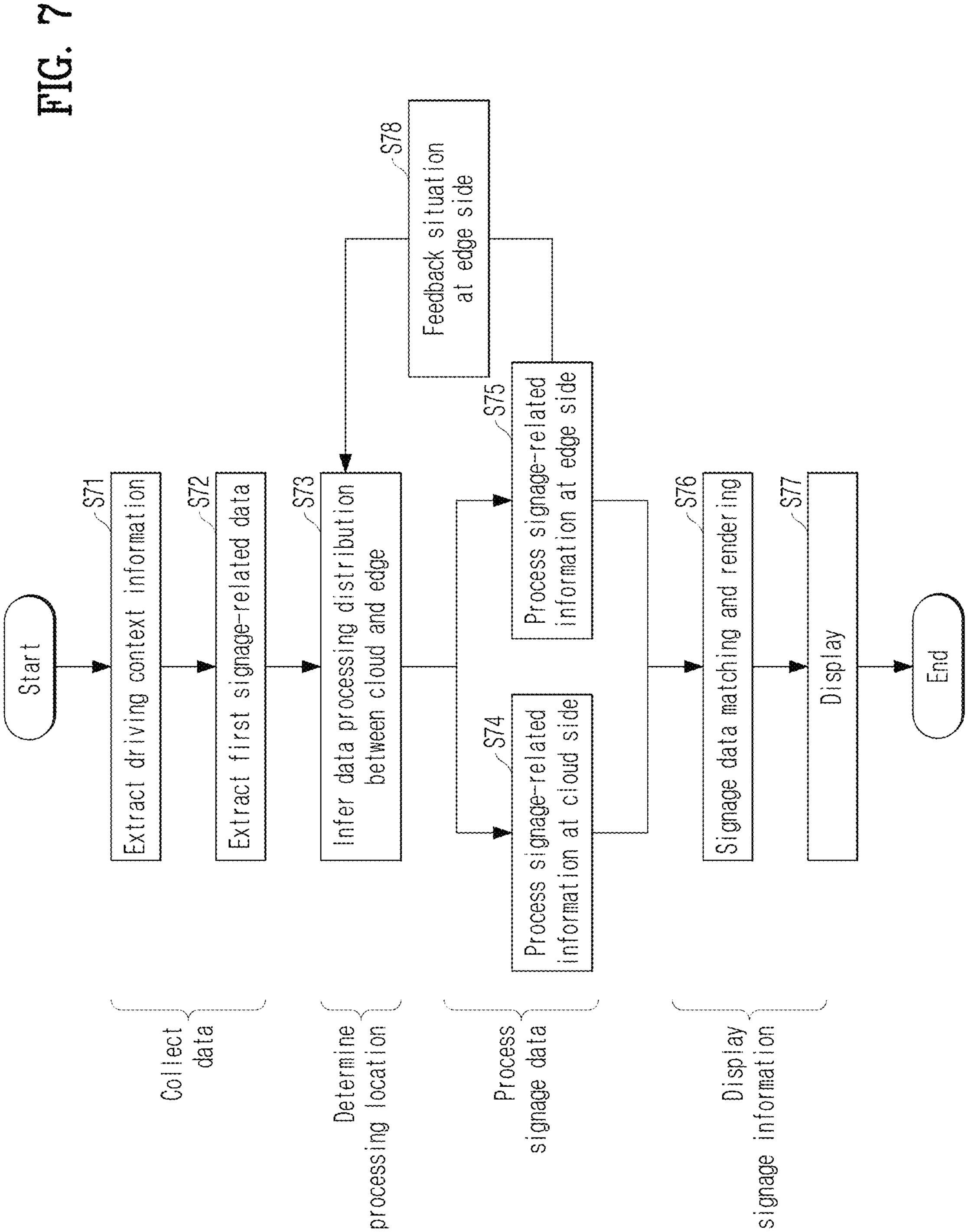
FIG. 7 is a flowchart of a cooperation method between an edge device and a cloud server according to an embodiment of the present disclosure.

Hereinafter, with reference to FIG. 7, a cooperation method between an edge device (i.e., the vehicle 100) and the cloud server 200 according to an embodiment of the present disclosure will be described. FIG. 7 is a flowchart of a cooperation method between an edge device and a cloud server according to an embodiment of the present disclosure.

First, the driving context data manager 300 of the vehicle 100 may collect various edge data related to the vehicle 100 and extract driving context information [S71]. Examples of the collected edge data and the extracted driving context information are as described above with respect to FIG. 6.

The driving context information may be transmitted to the signage data manager 500 via the cloud policy manager 400.

The signage data manager 500 may collect various signage-related information from at least one external data source and extract first signage-related information suitable for the vehicle 100 from the collected signage-related information based on the driving context data [S72]. The first signage-related information suitable for the vehicle 100 may be, for example, information (but not limited thereto) corresponding to the current location and/or expected movement path of the vehicle 100 from among the collected signage-related information.

Then, the cloud policy manager 400 may determine whether the first signage-related information is appropriately processed in the vehicle 100 or the cloud server 200, i.e., the processing location, based on the driving context data and the first signage-related information. This may be understood as inferring data processing distribution between the cloud server 200 and the edge device (i.e., the vehicle 100) [S73].

When the processing location is determined as the cloud server 200, the first signage-related information may be transmitted to the cloud signage data processor 700 and processed as data [S74]. That is, based on the display policy determined by the cloud policy manager 400, the second signage-related information that is inferred to be of interest to the user from among the first signage-related information may be filtered by the cloud signage data processor 700. The second signage-related information may be converted into media content such as AR graphic data, and display location information regarding a location in which the converted media content is to be displayed may be tagged to the converted media content.

When the processing location is determined as the vehicle 100, the first signage-related information may be transmitted to the edge signage data processor 1000 and processed as data [S75]. That is, based on the display policy determined by the cloud policy manager 400, the second signage-related information that is inferred to be of interest to the user from among the first signage-related information may be filtered by the edge signage data processor 1000. The second signage-related information may be converted into media content such as AR graphic data, and display location information regarding a location in which the converted media content is to be displayed may be tagged to the converted media content.

When the processing location is determined as the vehicle 100 and the cloud server 200, the first signage-related information may be transmitted to the cloud signage data processor 700 and processed as data [S74]. That is, based on the display policy determined by the cloud policy manager 400, the second signage-related information that is inferred to be of interest to the user from among the first signage-related information may be filtered by the cloud signage data processor 700.

The second signage-related information filtered by the cloud signage data processor 700 may be transmitted to the edge signage data processor 1000 and processed as data [S75]. That is, the second signage-related information may be converted into media content such as AR graphic data by the edge signage data processor 1000, and display location information regarding the location in which the media content is to be displayed may be tagged to the converted media content.

The media content tagged with the display location information may be transmitted to the rendering module 800 of the vehicle 100, and when the vehicle 100 is determined to approach the corresponding location of the media content within a predetermined distance or when the corresponding topography or feature is recognized through the driving image, the media content may be rendered to match the corresponding location or the corresponding topography or feature [S76].

The media content may be displayed through the display unit 151 together with the driving image to match the corresponding location or the corresponding topography or feature [S77].

The processing status of signage-related information in the vehicle 100 may be fed back to the cloud policy manager 400 [S78]. This is to prevent signage-related information that has already been processed in the vehicle 100 and stored in the memory 170 (for example, but not limited to, a cache memory) from being processed again, for example, the inference result from the edge signage data processor 1000 and/or the second signage-related information may be fed back to the cloud policy manager 400. Although not shown in FIG. 7, the rendered media content in operation S76 or the media content displayed in operation S77 may be fed back to the cloud policy manager 400 to prevent redundant processing.

The cloud policy manager 400 may refer to the fed-back information or data when determining the processing location. For example, when the fed back information or data overlaps the signage-related information that needs to be newly processed to a certain degree or more, the cloud policy manager 400 may determine the processing location to the vehicle 100, and the vehicle 100 may reuse the information or data, thereby preventing data processing from being performed redundantly.

Figure 8:
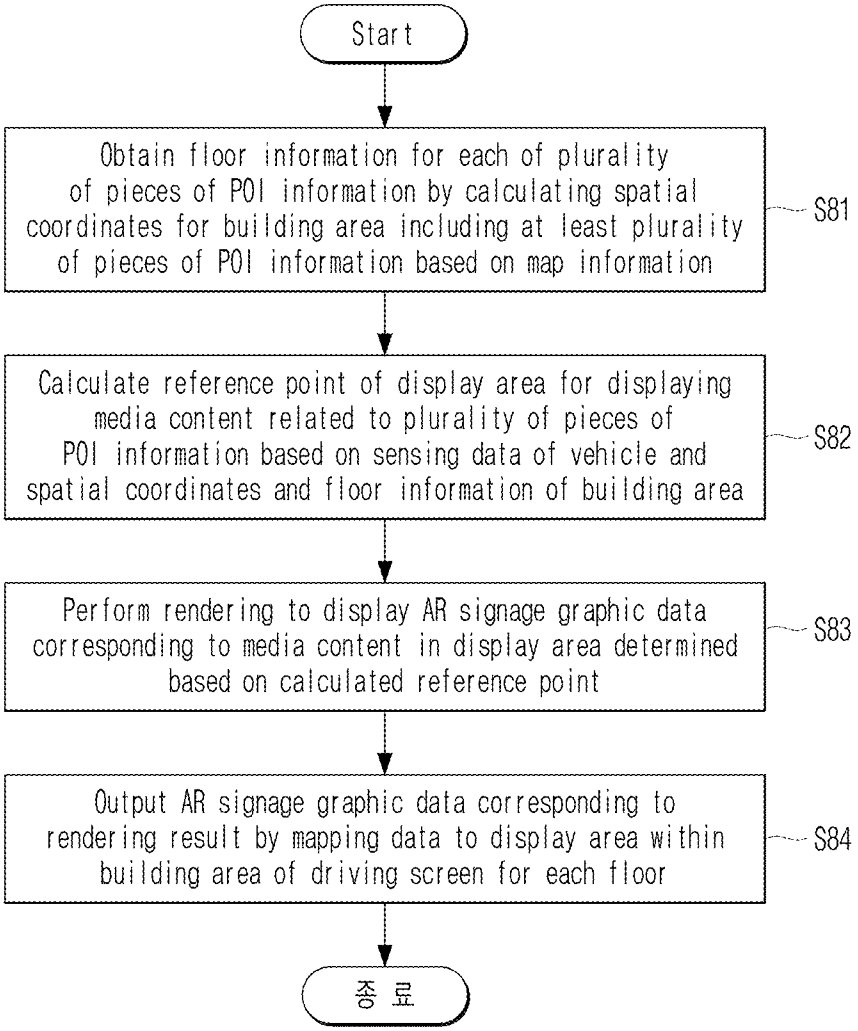
FIG. 8 is a flowchart showing a process for displaying media content processed through a cooperation system between an edge device and a cloud server according to an embodiment of the present disclosure.
Figure 9:
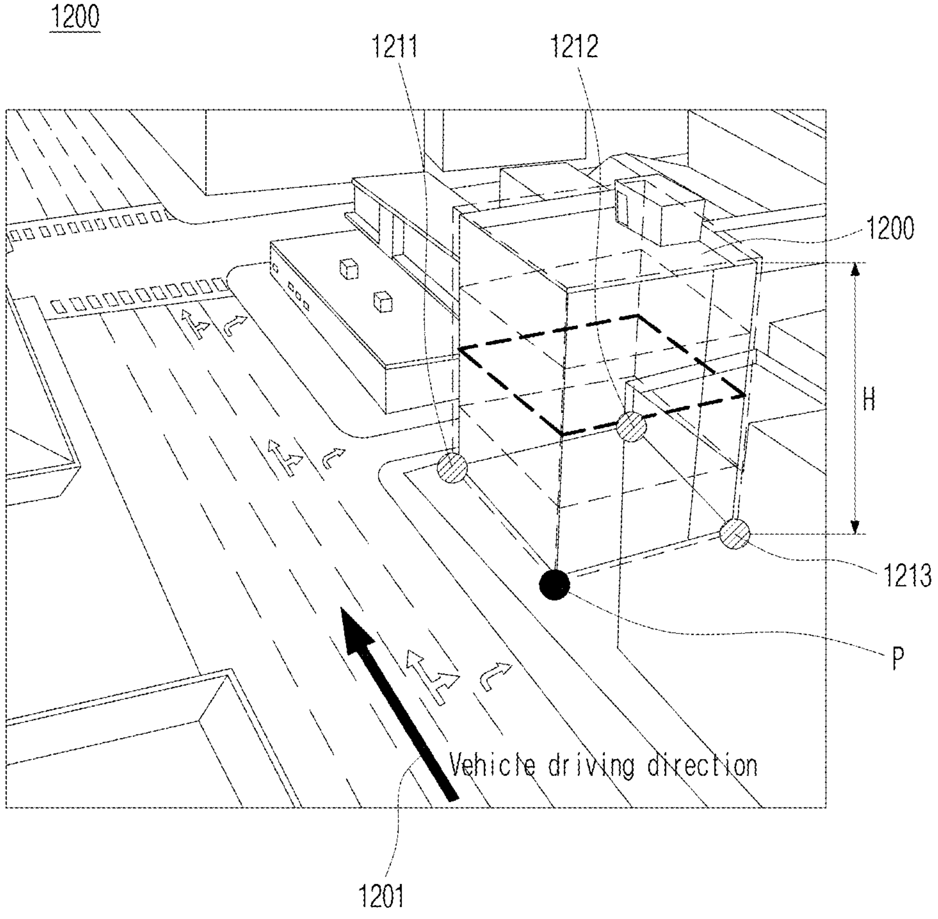
FIGS. 9 and 10 are diagrams showing display of media content processed through a cooperation system between an edge device and a cloud server according to an embodiment of the present disclosure.
Figure 10:
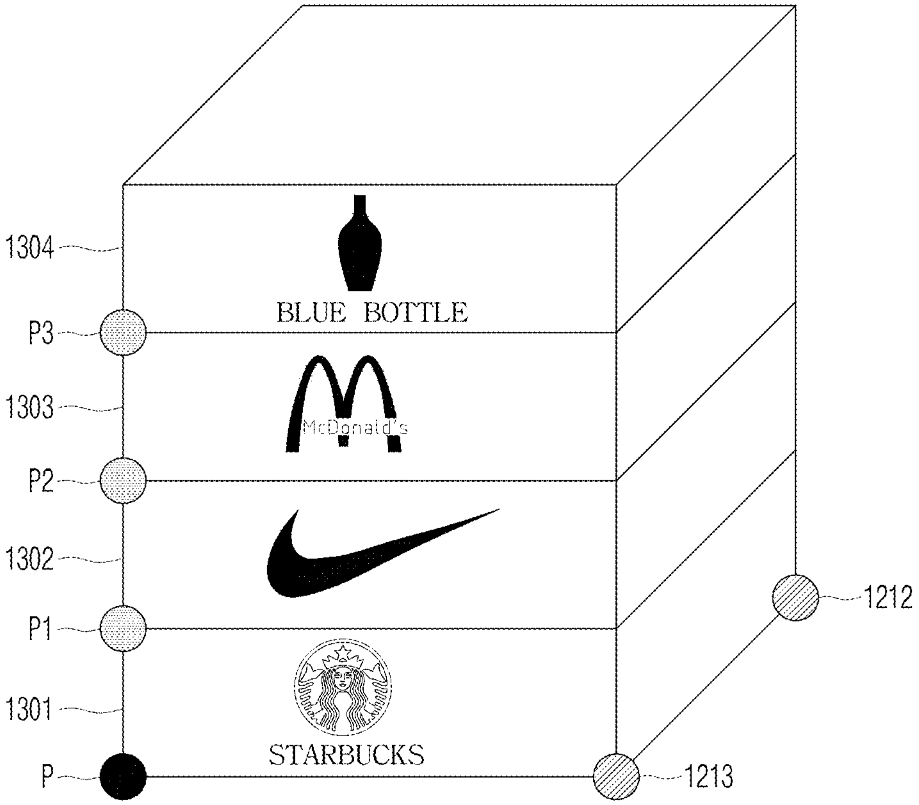

Hereinafter, with reference to FIGS. 8 to 10, a description will be given of media content such as the AR graphic data being displayed through the display unit 151. FIG. 8 is a flowchart illustrating a process for displaying media content processed through a cooperation system between an edge device and a cloud server according to an embodiment of the present disclosure, and FIGS. 9 and 10 illustrate examples for displaying media content processed through a cooperation system between an edge device and a cloud server according to an embodiment of the present disclosure.

The "map information" disclosed in the present specification mentioned in the present disclosure may be referred to as including an image captured by a vision sensor such as a camera, two-dimensional map information, three-dimensional map information, a digital twin three-dimensional map, and map information in a real/virtual space.

The "point of interest (POI) information" mentioned in the present disclosure is a point of interest selected based on the map information and may include pre-registered POI information (POI stored on a map of a cloud server), user-defined POI information (e.g., my home, school, and company), driving-related POI information (e.g., destination, waypoint, gas station, rest area, and parking lot), and top search POI information (e.g., POI with a lot of recent clicks/visits and hot places). This POI information may be updated in real time based on the current location of the vehicle 100.

The "driving image" mentioned in the present disclosure may be obtained through a vision sensor of the vehicle 100 or the surroundings of the vehicle 100, and may include, for example, an image obtained or projected through a vision sensor (external camera, laser sensor for image, and the like) while the vehicle travels, an image of the real world projected on a windshield of the vehicle, or an image of a virtual space. That is, the driving image may be referred to as including all images output through a display, images projected through a laser sensor, or the image of reality itself seen through the windshield of the vehicle.

The rendering module 800 of the vehicle 100 may obtain floor information for each of a plurality of pieces of POI information by calculating spatial coordinates for a building area including at least the plurality of pieces of POI information from the map information [S81]. That is, when a building including a plurality of POIs is detected/recognized from the map information, x, y, and z coordinate information therefor may be calculated as spatial coordinates.

When the map information is 2D/3D map information received from the cloud server 200, spatial coordinates may be calculated by receiving information on the location, height, and number of floors of a building area including the plurality of pieces of POI information from the cloud server.

Alternatively, when the map information is a driving image obtained through a vision sensor such as a camera equipped in a vehicle, the location, height, and number of floors of the building area may be estimated based on the driving image, and spatial coordinates may be estimated therefrom.

As such, when the spatial coordinates for the building area are calculated, the floor information for each of the plurality of pieces of POI information included in the building area may be calculated/estimated. For example, a floor height value, i.e. a height offset, may be calculated based on the height and number of floors of a building included in the spatial coordinates for a building area, and based thereon, each floor corresponding to the plurality of pieces of POI information may be calculated or estimated.

The rendering module 800 may calculate a reference point for displaying media content such as AR signage graphic data related to a plurality of pieces of POI information based on the sensing data of the vehicle 100 and the spatial coordinates and floor information of the building area [S82]. The media content may mean, for example, brand icons, 3D models, still images, and video images for advertising exposure related to POI.

The reference point of the building area in which the media content information is to be displayed may be calculated by matching information about vehicle sensing data (vehicle driving speed and direction), spatial coordinates of the building area, and floor information of each POI piece of information to correspond to the driving image.

The reference point may be determined as a coordinate point closest to the current location based on a driving direction of the vehicle from among the spatial coordinates of the building area.

Each display area for the plurality of pieces of POI information is set to a location moved by the corresponding floor number+height offset from the reference point by applying a height offset to the floor information corresponding to each of the plurality of pieces of POI information based on the reference point.

Here, the coordinate point close to the current location of the vehicle 100 may be obtained or estimated through edge detection of a building recognized using coordinate data included in map information or sensing information of a camera equipped in the vehicle. In this case, the reference point for each media content corresponding to the plurality of pieces of POI information (hereinafter, "floor-specific reference point") may be set to a height offset (off) equal to the reference point+the number of floors matching each POI piece of information. That is, different floor-specific reference points may be calculated and applied to each of a plurality of media contents.

The rendering module 800 may perform rendering to display AR signage graphic data corresponding to the media content in a display area determined based on the calculated reference point [S83].

The rendering module 800 may determine a display area for mapping a plurality of AR signage graphic data matching the plurality of pieces of POI information to each floor of the building.

In detail, the display areas of the plurality of AR signage graphic data corresponding to the plurality of pieces of POI information may be determined using the height information of the building area calculated based on the spatial coordinates for the building area and the floor information matching each of the plurality of pieces of POI information.

When the spatial coordinates for the building area may not be obtained based on the map information, the rendering module 800 may determine the display area to map the media content information by using the height information and floor information of the building area estimated using the camera sensing information included in the sensing data of the vehicle 100.

The rendering result may be output to match each floor of the display area of the building in the driving image and displayed on the display unit 151 [S84].

Hereinafter, a detailed explanation will be provided with reference to FIGS. 9 and 10.

Referring to FIG. 9, when a building area 1200 including a plurality of pieces of POI information is detected, spatial coordinates 1211, 1212, 1213, and P for the building area 1200 may be calculated (or estimated) based on map information (e.g., 2D/3D map information, or number of floors and height information of the building area) or a driving image obtained through a vision sensor such as an external camera equipped in the vehicle 100.

By using the sensing data (e.g., vehicle driving direction) of the vehicle 100 and the spatial coordinates 1211, 1212, 1213, and P and the building height and floor information included in the map information (or estimated through edge detection of the driving image), an origin P for mapping AR signage graphic data for each floor to the driving image may be extracted.

That is, a reference coordinate closest to the location of the vehicle 100 included in the sensing data of the vehicle 100 may be set as the origin P in consideration of a driving direction 1201 of the vehicle 100 from among the spatial coordinates 1211, 1212, 1213, and P of the building area.

For example, when information on the number of floors and height of the building area 1200 may be obtained from the map information, the origin P may be calculated by considering the driving direction of the vehicle 100. However, when map information for the building area 1200 does not exist (or is not recognized) or information on the number of floors and height may not be obtained, the height and number of floors of the building may be estimated from an image of the building by using sensing information of the vision sensor equipped in the vehicle 100, and the origin for the building area may be extracted by detecting the edge of the image. In this case, the height of each floor may be used as a predefined value.

For multiple AR signage graphic data to be displayed for each floor, the "floor-specific reference point" needs to be calculated for each of the multiple AR signage graphic data.

In this regard, referring to FIG. 10, the "floor-specific reference point" for the plurality of AR signage graphic data is a location moved in height by the number of floors of the corresponding POI information based on the spatial coordinates 1211, 1212, 1213, and P of the building area and the origin P. That is, the location in which the origin P+the height offset (off) corresponding to the number of floors matching each piece of POI information is applied may be determined as the "floor-specific reference point", and the corresponding AR signage graphic data may be mapped thereto.

In FIG. 10, a reference point of first AR signage graphic data 1301 displayed on a first floor of the building area 1200 may be determined as the origin P. The floor-specific reference point of second AR signage graphic data 1302 displayed on the second floor of the building area 1200 may be determined as a point PI obtained by applying a height offset of two floors from the origin P. In addition, the floor-specific reference points of third and fourth AR signage graphic data 1303 and 1304 displayed on third and fourth floors, respectively, of the building area 1200 may be determined as points P2 and P3 obtained by applying height offsets of three and four floors, respectively, from the origin P.

To more accurately calculate height information of the building area, the height information of each display area determined based on the floor-specific reference point as above (e.g., inter-floor height offset) is compared with height data included in the map information (e.g., 2D/3D map information), and at least one of the location and shape of each display area may be corrected based on the comparison result. When a difference greater than or equal to a threshold value (normal error range) is detected between height information of an initially calculated inter-floor height offset and height information of the building area obtained through the database 600, the location of each display area may be corrected using the height information of the database 600.

For example, the inter-floor height offset described in FIG. 10 may be changed. Alternatively, for example, in FIG. 10, a plurality of AR signage graphic data 1301, 1302, 1303, and 1304 may be mapped for respective floors to a lateral surface, not a front surface, of the building area 1200.

The plurality of AR signage graphic data 1301, 1302, 1303, and 1304 mapped to the respective floors in the building area 1200 may be mapped to surround at least one surface of each display area of the building in the driving image. In FIG. 10, the plurality of AR signage graphic data 1301, 1302, 1303, and 1304 may be formed to cover the front surface of the building area 1200 for the respective floors. Accordingly, multiple advertising exposure effects may be provided on each floor of a building, and a sense of realism similar to that of an actual signage display board may be provided.

Figure 11:
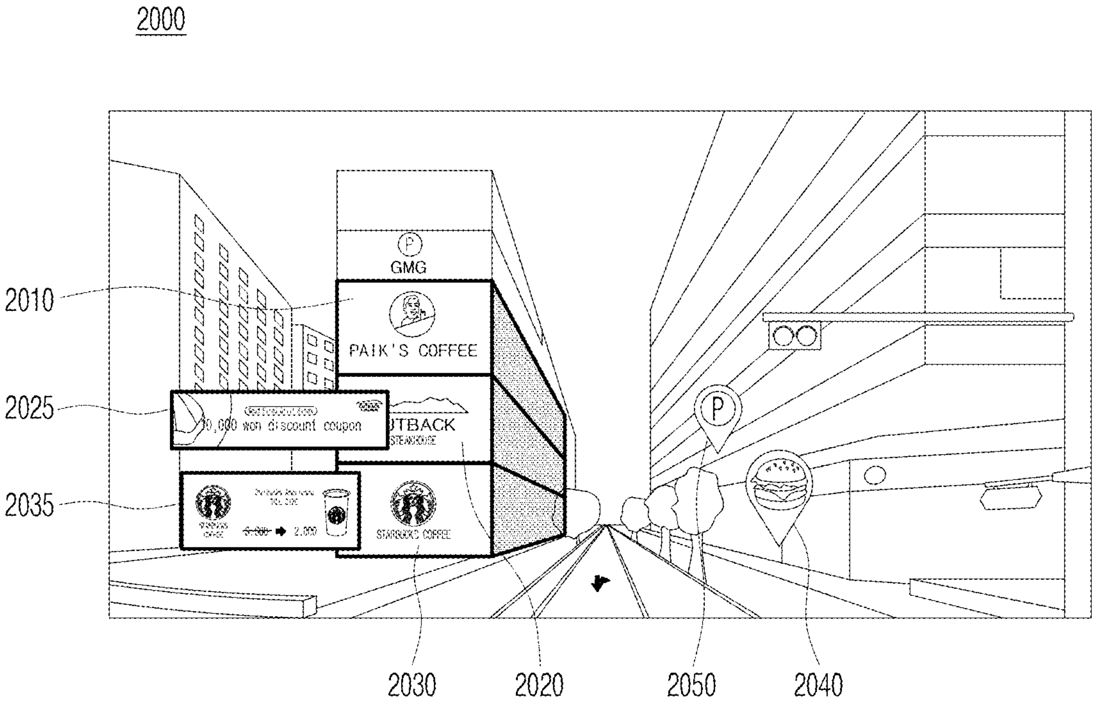
FIG. 11 illustrates a driving image in which AR signage graphic data is displayed according to an embodiment of the present disclosure.

The display of at least one AR signage graphic data on the driving image in this manner will be further described with reference to FIG. 11. FIG. 11 illustrates a driving image in which AR signage graphic data is displayed according to an embodiment of the present disclosure.

As illustrated in FIG. 11, the driving image 2000 may be output through the display unit 151, projected through a laser sensor, or the like, or displayed through a windshield of the vehicle 100.

In this case, at least one AR signage graphic data may be overlaid and displayed on the driving image 2000 to match the corresponding location or corresponding topography or feature. FIG. 11 illustrates an example of a plurality of AR signage graphic data 2010, 2020, 2025, 2030, 2035, 2040, and 2050 being displayed.

The at least one AR signage graphic data may include advertising signage 2010, 2020, and 2030, coupon signage 2025 and 2035, driving guidance signage 2040 and 2050. The coupon signage 2025 and 2035 may be displayed together with the corresponding advertising signage 2010, 2020, and 2030.

From among the plurality of AR signage graphic data 2010, 2020, 2025, 2030, 2035, 2040, and 2050, for example, the processing locations of some data 2010, 2020, 2025, 2030, and 2035 may be the cloud server 200, and the processing location of the remaining data 2040 and 2050 may be the vehicle 100.

In the driving image 2000, only AR signage graphic data, the processing location of which is the cloud server 200, may be displayed, or only AR signage graphic data, the processing location of which is the vehicle 100, may be displayed, or these may be displayed mixed with each other.

Hereinafter, the logic for determining the processing location will be explained.

Figure 12:
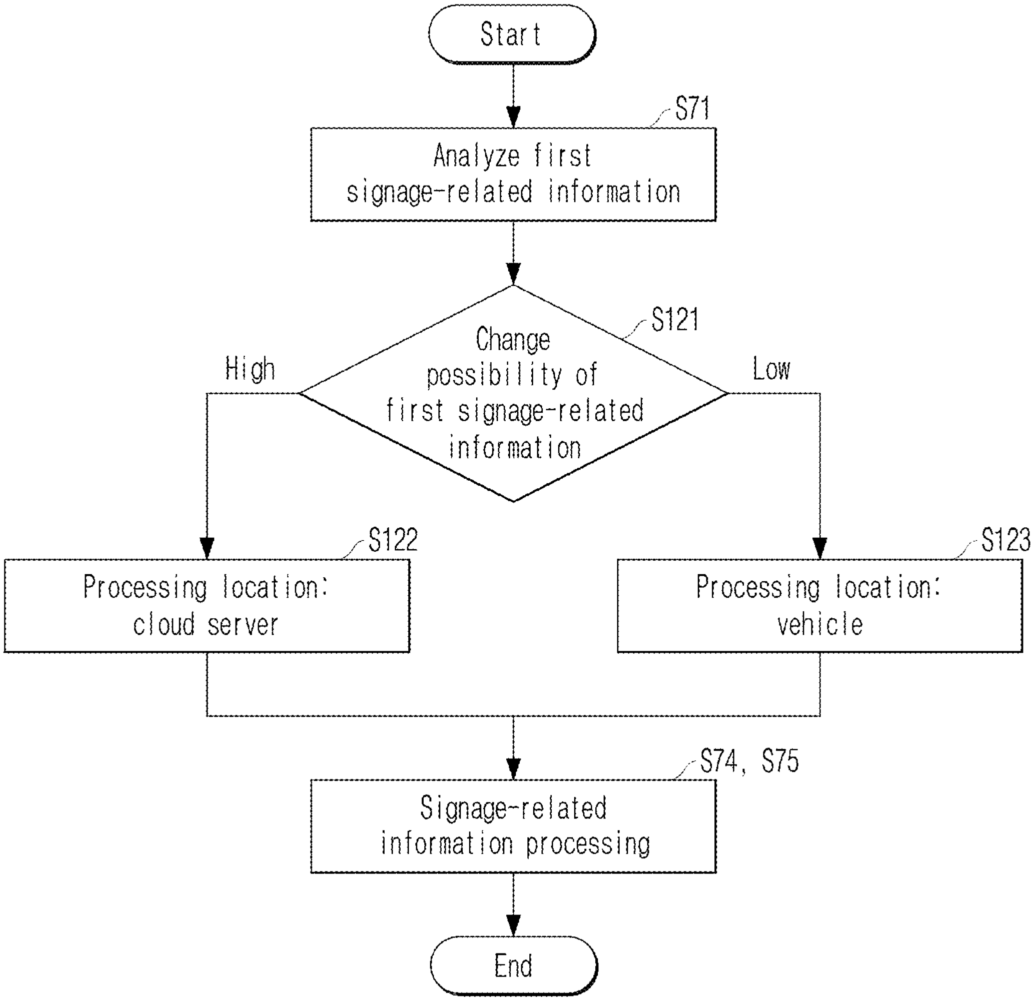
FIG. 12 is a flowchart illustrating logic for determining a processing location according to an embodiment of the present disclosure.
Figure 13:
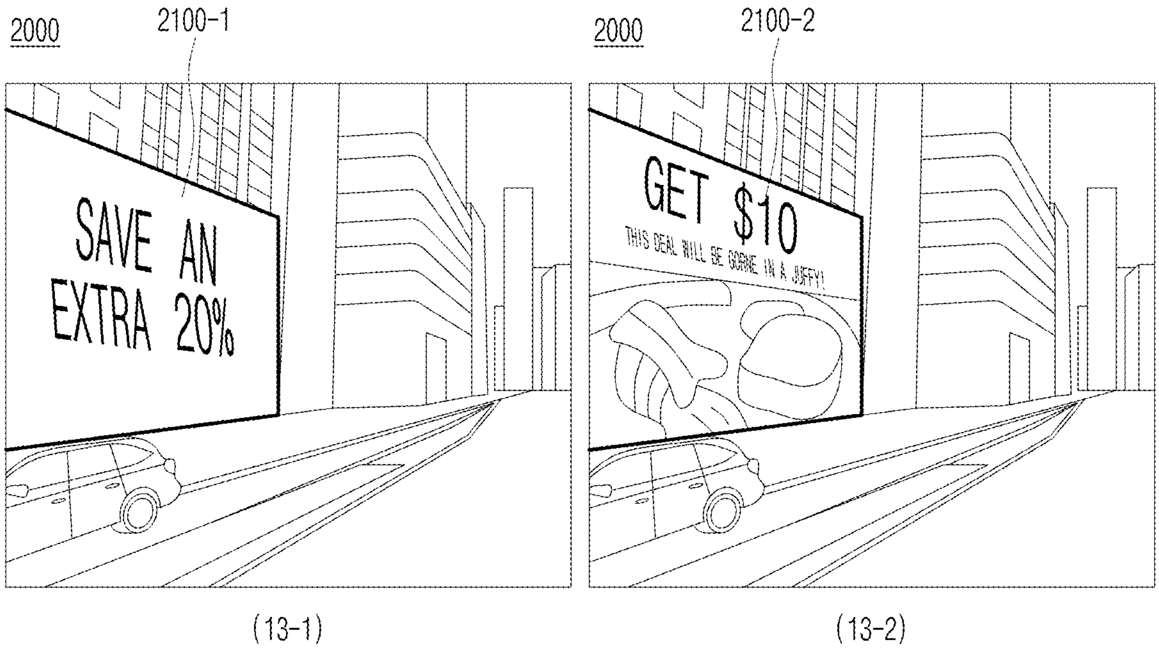
FIG. 13 illustrates a driving image in which AR signage graphic data is displayed according to an embodiment of the present disclosure.

First, with reference to FIGS. 12 and 13, the logic by which the processing location is determined will be described. FIG. 12 is a flowchart illustrating the logic for determining a processing location according to an embodiment of the present disclosure, and FIG. 13 illustrates a driving image on which AR signage graphic data is displayed according to an embodiment of the present disclosure.

As described above, the vehicle 100 may collect various edge data while driving or stopped.

Edge data collected from the vehicle 100 may be converted into driving context data and provided to the cloud server 200.

The signage data manager 500 of the cloud server 200 may collect various signage-related information from at least one external data source. The signage data manager 500 may extract appropriate signage-related information, i.e., first signage-related information, for the vehicle 100 based on the driving context data in consideration of whether it corresponds to a current location and/or a location corresponding to an expected movement path of the vehicle 100 and provide the extracted first signage-related information to the cloud policy manager 400.

Then, the cloud policy manager 400 may determine whether the extracted first signage-related information is appropriately processed in the vehicle 100 or the cloud server 200, i.e., the processing location, based on at least one of the driving context data and the extracted first signage-related information.

First, depending on the characteristic of the first signage-related information, the cloud policy manager 400 may determine the processing location of the first signage-related information [S71].

For example, the cloud policy manager 400 may consider a change possibility of the first signage-related information when determining the processing location of the first signage-related information [S121].

Here, the "information change possibility" of the first signage-related information may mean the possibility that the first signage-related information may change within a predetermined unit of time.

For example, when the first signage-related information is an advertisement (or coupon) signage for a specific brand, the information change possibility may be determined based on whether content of the advertisement is likely to change within a predetermined unit of time (e.g., 30 seconds) or whether the advertisement is likely to change to a different advertisement.

Alternatively, when the first signage-related information is related to the signage location information, the information change possibility may be determined based on whether the signage location information is likely to change within a predetermined unit of time.

When there is a high information change possibility, first AR signage graphic data 2100-1 corresponding to the first signage-related information displayed together with the driving image 2000 as shown in (13-1) of FIG. 13 may be changed to second AR signage graphic data 2100-2 as shown in (13-2) of FIG. 13 within the predetermined time.

In this case, the cloud policy manager 400 may determine the processing location of the first signage-related information to the cloud server 200 [S122]. When there is a high information change possibility, the processing location may be determined as the cloud server 200 to more quickly and efficiently respond to the information change possibility of the first signage-related information.

When there is a low information change possibility, the cloud policy manager 400 may determine the processing location of the first signage-related information to the vehicle 100 [S123]. When there is a low information change possibility, the processing location is determined as the vehicle 100, and thus even if communication between the cloud server 200 and the vehicle 100 becomes temporarily unstable in the future, the AR signage graphic data corresponding to the first signage-related information may be stably displayed.

When the processing location is determined as the cloud server 200 or the vehicle 100 by the cloud policy manager 400, the process of processing the first signage-related information has been described above [S74 and S75], and thus a detailed description will be omitted.

Figure 14:
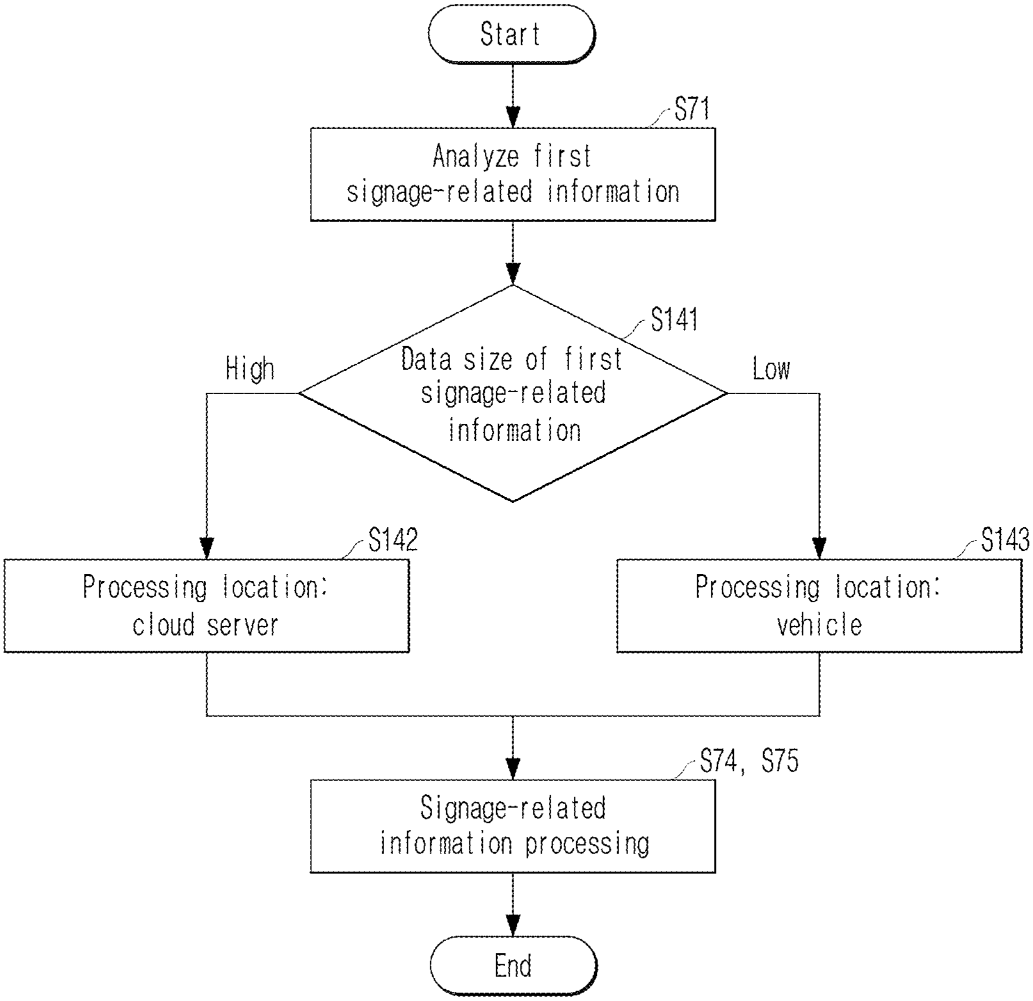
FIG. 14 is a flowchart illustrating logic for determining a processing location according to an embodiment of the present disclosure.

Considering the change possibility as the characteristic of the first signage-related information, the logic for determining the processing location has been described above. However, the processing location may be determined by considering the data size in addition to the change possibility as the characteristic of the first signage-related information. This will be further explained with reference to FIGS. 14 and 15. FIG. 14 is a flowchart illustrating the logic for determining a processing location according to an embodiment of the present disclosure, and FIG. 15 illustrates a driving image on which AR signage graphic data is displayed according to an embodiment of the present disclosure.

As described above, the vehicle 100 may collect various edge data while driving or stopped.

Edge data collected from the vehicle 100 may be converted into driving context data and provided to the cloud server 200.

The signage data manager 500 of the cloud server 200 may collect various signage-related information from at least one external data source. The signage data manager 500 may extract appropriate signage-related information, i.e., first signage-related information, for the vehicle 100 based on the driving context data in consideration of whether it corresponds to a current location and/or a location corresponding to an expected movement path of the vehicle 100, and provide the extracted first signage-related information to the cloud policy manager 400.

Then, the cloud policy manager 400 may determine whether the extracted first signage-related information is appropriately processed in the vehicle 100 or the cloud server 200, i.e., the processing location, based on at least one of the driving context data and the extracted first signage-related information.

First, depending on the characteristic of the first signage-related information, the cloud policy manager 400 may determine the processing location of the first signage-related information [S71].

For example, the cloud policy manager 400 may consider a data size of the first signage-related information when determining the processing location of the first signage-related information [S141].

The data size of the first signage-related information may be proportional to the amount of computational resources and processing complexity required to process the first signage-related information.

The data size of the first signage-related information may vary depending on the type and/or number of data of the first signage-related information.

For example, when the type of data for the first signage-related information is 3D, the data size may be larger than when the type is 2D.

As the number of data of the first signage-related information (e.g., the number of signage displays) is increased, the data size may be increased. For example, data 2110 to 2160 of the first signage-related information of (15-1) of FIG. 15 may be more than data 2120 and 2160 of the first signage-related information of (15-2) of FIG. 15.

When the data size of the first signage-related information is greater than or equal to a predetermined value, the cloud policy manager 400 may determine the processing location of the first signage-related information as the cloud server 200 [S142]. When the data size is greater than or equal to a predetermined value, the processing location may be determined as the cloud server 200, thereby allowing the cloud server 200 to take charge of the computational resources and processing complexity according to the first signage-related information, rather than the vehicle 100.

When the data size of the first signage-related information is less than the predetermined value, the cloud policy manager 400 may determine the processing location of the first signage-related information as the vehicle 100 [S143]. When the data size is less than the predetermined value, the processing location is determined as the vehicle 100, and thus even if communication between the cloud server 200 and the vehicle 100 becomes temporarily unstable in the future, the AR signage graphic data corresponding to the first signage-related information may be stably displayed.

When the processing location is determined as the cloud server 200 or the vehicle 100 by the cloud policy manager 400, the process of processing the first signage-related information has been described above [S74 and S75], and thus a detailed description will be omitted.

Figure 16:
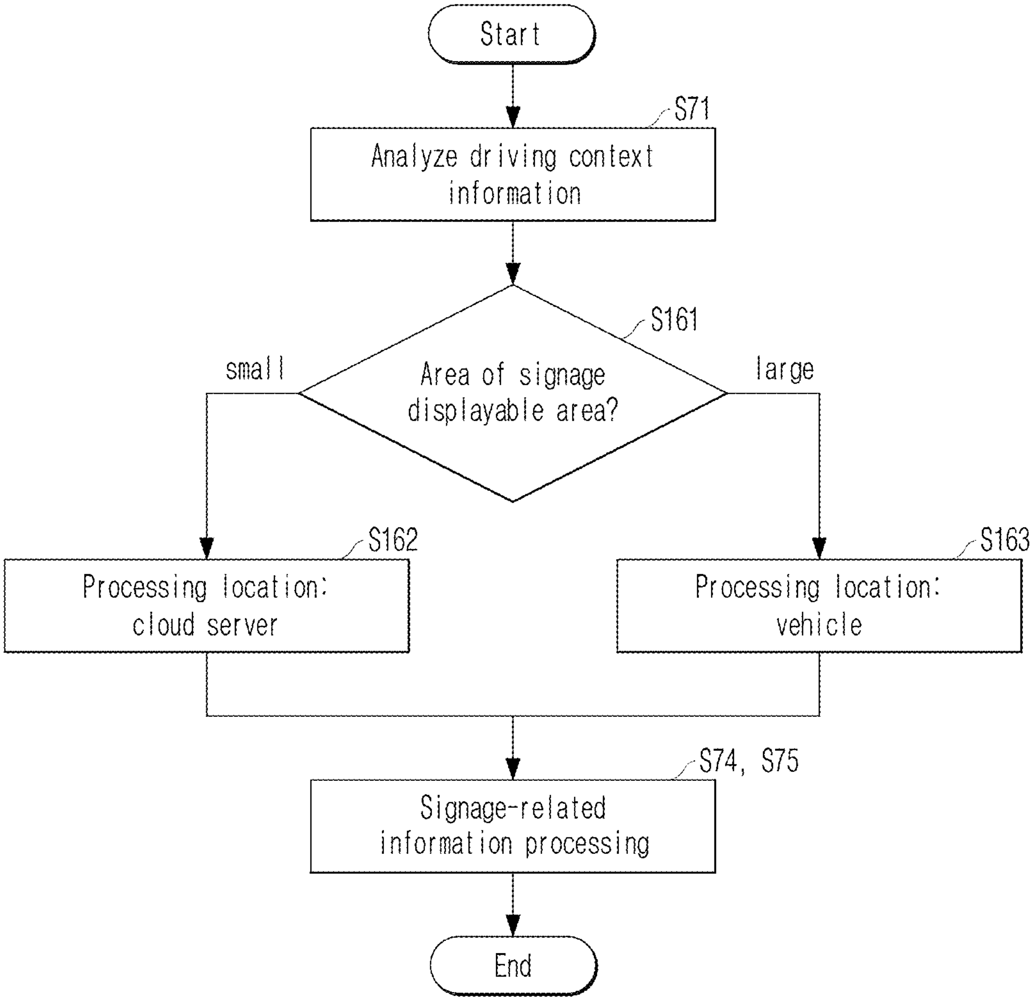
FIG. 16 is a flowchart illustrating logic for determining a processing location according to an embodiment of the present disclosure.

Considering the characteristic of the first signage-related information, the logic for determining the processing location has been described above. However, the processing location may be determined by considering the signage displayable area based on the driving context information. This will be further explained with reference to FIGS. 16 and 17. FIG. 16 is a flowchart illustrating the logic for determining a processing location according to an embodiment of the present disclosure, and FIG. 17 illustrates a driving image on which AR signage graphic data is displayed according to an embodiment of the present disclosure.

Edge data collected from the vehicle 100 may be converted into driving context data and provided to the cloud server 200.

The signage data manager 500 of the cloud server 200 may collect various signage-related information from at least one external data source. The signage data manager 500 may extract appropriate signage-related information, i.e., first signage-related information, for the vehicle 100 based on the driving context data in consideration of whether it corresponds to a current location and/or a location corresponding to an expected movement path of the vehicle 100, and provide the extracted first signage-related information to the cloud policy manager 400.

Then, the cloud policy manager 400 may determine whether the extracted first signage-related information is appropriately processed in the vehicle 100 or the cloud server 200, i.e., the processing location, based on at least one of the driving context data and the extracted first signage-related information.

Depending on the signage displayable area depending on the driving context data, the cloud policy manager 400 may determine the processing location of the first signage-related information [S71 and S161].

For example, when the vehicle 100 travels in a city center, as shown in (17-1) of FIG. 17, the signage displayable area may be determined as a wall surface 2210 on a specific floor of a specific building.

When the signage displayable area is less than a predetermined area, such as a wall surface on a specific floor of a specific building, the cloud policy manager 400 may determine the processing location of the first signage-related information as the cloud server 200 [S162].

When the signage displayable area is less than a predetermined area, such as a wall surface on a specific floor of a specific building, a lot of computational resources may be required or processing complexity may be high according to the first signage-related information, and thus the computational resources and processing complexity are to be handled by the cloud server 200 rather than the vehicle 100.

However, when the vehicle 100 travels in a tunnel, for example, as shown in (17-2) of FIG. 17, the signage displayable area may be determined as a side wall surface 2220 of the tunnel.

When the signage displayable area is greater than or equal to a predetermined area, such as a side wall surface of the tunnel, the cloud policy manager 400 may determine the processing location of the first signage-related information as the vehicle 100 [S163]. When the signage displayable area is equal to or equal to a predetermined area, such as the side wall surface of the tunnel, the computational resources according to the first signage-related information may not be required much or the processing complexity may be low; and thus there may not be a major problem even if the vehicle 100 is capable of handling it.

When the processing location is determined as the cloud server 200 or the vehicle 100 by the cloud policy manager 400, the process of processing the first signage-related information has been described above [S74 and S75], and thus a detailed description will be omitted.

Figure 18:
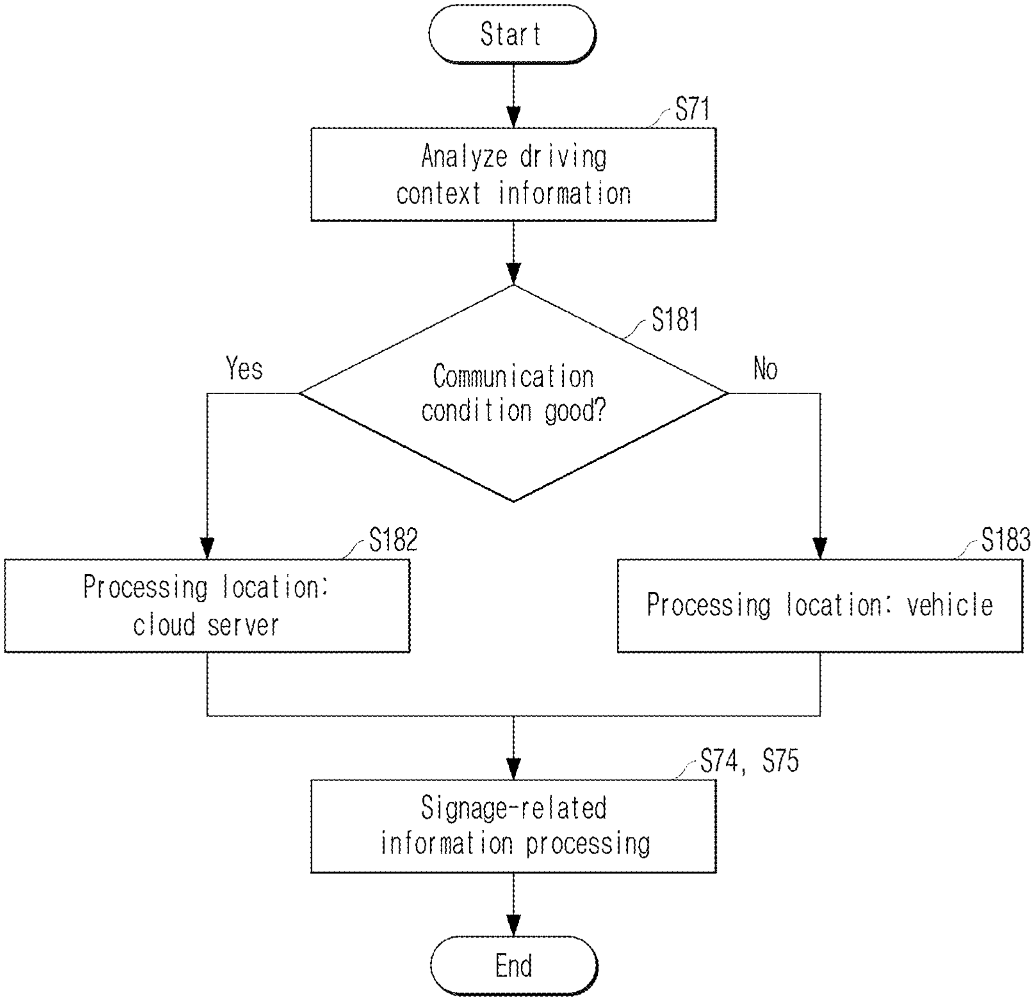
FIG. 18 is a flowchart illustrating logic for determining a processing location according to an embodiment of the present disclosure.

The logic for determining the processing location by considering the signage displayable area based on the driving context information has been described above. However, the processing location may be determined by considering communication traffic or communication availability between the client 200 and the vehicle 100. This will be further explained with reference to FIG. 18. FIG. 18 is a flowchart illustrating logic for determining a processing location according to an embodiment of the present disclosure.

Edge data collected from the vehicle 100 may be converted into driving context data and provided to the cloud server 200.

The signage data manager 500 of the cloud server 200 may collect various signage-related information from at least one external data source. The signage data manager 500 may extract appropriate signage-related information, i.e., first signage-related information, for the vehicle 100 based on the driving context data in consideration of whether it corresponds to a current location and/or a location corresponding to an expected movement path of the vehicle 100, and provide the extracted first signage-related information to the cloud policy manager 400.

Then, the cloud policy manager 400 may determine whether the extracted first signage-related information is appropriately processed in the vehicle 100 or the cloud server 200, i.e., the processing location, based on at least one of the driving context data and the extracted first signage-related information.

The cloud policy manager 400 may determine the processing location of the first signage-related information depending on the communication traffic or communication availability between the client 200 and the vehicle 100 according to the driving context data [S71 and S181].

The cloud policy manager 400 may not necessarily need to refer to the driving context data when determining the processing location of the first signage-related information based on the communication traffic or the communication availability. The cloud policy manager 400 or the cloud server 200 may independently determine a communication traffic situation or the communication availability with the vehicle 100, and based thereon, the processing location of the first signage-related information may also be determined.

For example, when the vehicle 100 travels in the city outside a tunnel, as shown in (17-1) of FIG. 17, communication between the client 200 and the vehicle 100 may be smooth.

When communication is smooth between the client 200 and the vehicle 100, the cloud policy manager 400 may determine the processing location of the first signage-related information as the cloud server 200 [S182].

However, when the vehicle 100 travels in a tunnel, for example, as shown in (17-2) of FIG. 17, communication between the client 200 and the vehicle 100 may not be smooth.

When communication is not smooth between the client 200 and the vehicle 100, the cloud policy manager 400 may determine the processing location of the first signage-related information as the vehicle 100 [S183].

When the processing location is determined as the cloud server 200 or the vehicle 100 by the cloud policy manager 400, the process of processing the first signage-related information has been described above [S74 and S75], and thus a detailed description will be omitted.

Figure 19:
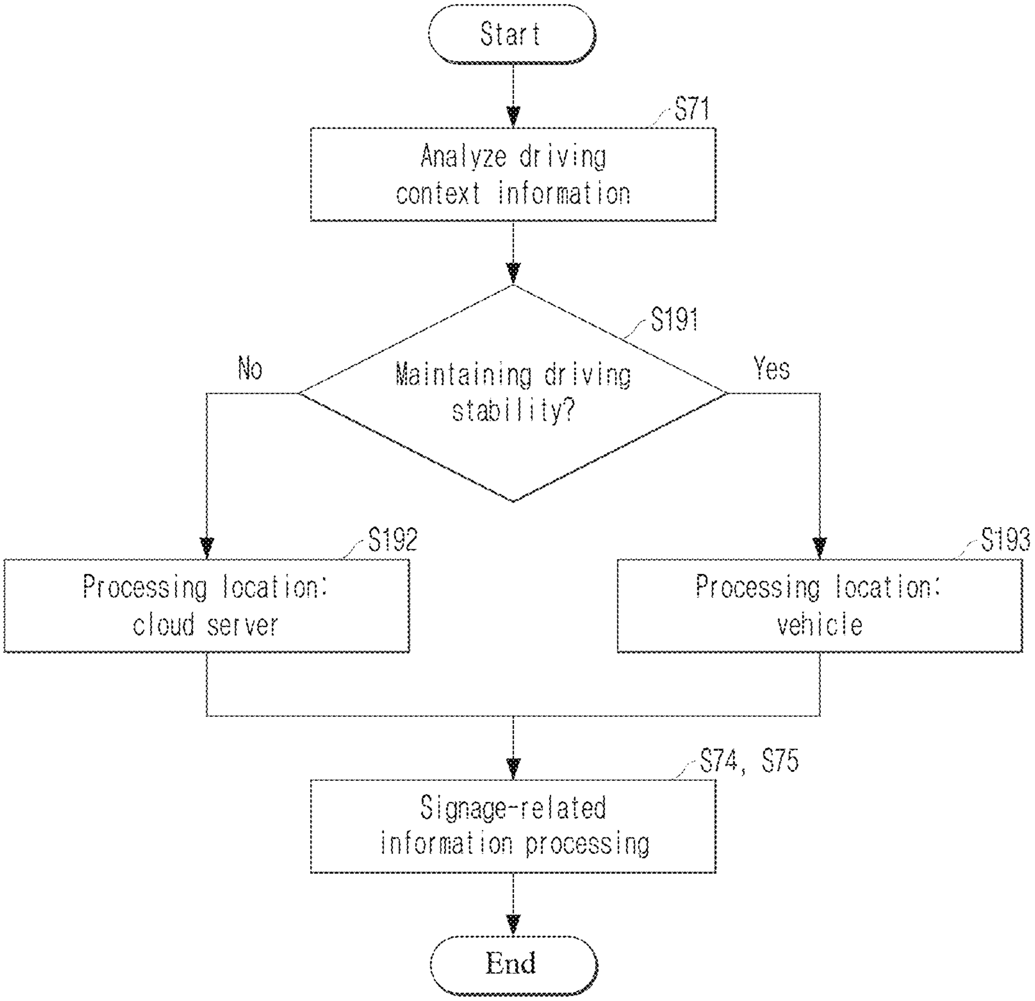
FIG. 19 is a flowchart illustrating logic for determining a processing location according to an embodiment of the present disclosure.

The logic for determining the processing location in consideration of the signage displayable area based on the driving context information or in consideration of the communication traffic or communication availability between the client 200 and the vehicle 100 has been described above. However, the processing location may be determined based on the driving stability of the vehicle 100. This will be further explained with reference to FIGS. 19 and 20. FIG. 19 is a flowchart illustrating the logic for determining a processing location according to an embodiment of the present disclosure, and FIG. 20 illustrates a driving image on which AR signage graphic data is displayed according to an embodiment of the present disclosure.

Edge data collected from the vehicle 100 may be converted into driving context data and provided to the cloud server 200.

The signage data manager 500 of the cloud server 200 may collect various signage-related information from at least one external data source. The signage data manager 500 may extract appropriate signage-related information, i.e., first signage-related information, for the vehicle 100 based on the driving context data in consideration of whether it corresponds to a current location and/or a location corresponding to an expected movement path of the vehicle 100, and provide the extracted first signage-related information to the cloud policy manager 400.

Then, the cloud policy manager 400 may determine whether the extracted first signage-related information is appropriately processed in the vehicle 100 or the cloud server 200, i.e., the processing location, based on at least one of the driving context data and the extracted first signage-related information.

Depending on the driving stability of the vehicle based on the driving context data, the cloud policy manager 400 may determine the processing location of the first signage-related information [S71 and S191].

For example, as shown in (20-1) of FIG. 20, when the vehicle 100 travels in the city center, it may not be considered that the driving stability of the vehicle 100 is maintained. This is because, in the city center, a driver may frequently have to make left and right turns, stop, and accelerate repeatedly due to complex road networks, traffic, and various traffic lights.

When it is not possible to maintain the driving stability of the vehicle 100, the cloud policy manager 400 may determine the processing location of the first signage-related information as the cloud server 200 [S192]. Accordingly, AR signage graphic data 2210 according to the first signage-related information may be processed by the cloud server 200.

When it is not possible to maintain the driving stability of the vehicle 100, a lot of computational resources of the vehicle 100 may be required for stable driving of the vehicle 100, and therefore, computational resources for the first signage-related information are to be handled by the cloud server 200 rather than the vehicle 100.

However, as shown in (20-2) of FIG. 20, when the vehicle 100 travels at a constant speed in a highway or a dedicated automobile road, it may be seen that the driving stability of the vehicle 100 is maintained. This is because, unlike in the city center, there is no need to frequently repeat left and right turns, stop, and accelerate.

When it is possible to maintain the driving stability of the vehicle 100, the cloud policy manager 400 may determine the processing location of the first signage-related information as the vehicle 100 [S193]. Accordingly, AR signage graphic data 2230 and 2240 according to the first signage-related information may be processed by the vehicle 100. A displayable area of the AR signage graphic data 2230 and 2240 may be an edge area of a highway or a dedicated automobile road. That is, the displayable area of the AR signage graphic data 2230 and 2240 may not need to be a wall surface of a specific building.

When it is possible to maintain the driving stability of the vehicle 100, a lot of computational resources of the vehicle 100 may not be required for stable driving of the vehicle 100, and therefore, there may be no major problem even if the vehicle 100 is in charge of computational resources for the first signage-related information.

When the processing location is determined as the cloud server 200 or the vehicle 100 by the cloud policy manager 400, the process of processing the first signage-related information has been described above [S74 and S75], and thus a detailed description will be omitted.

Figure 21:
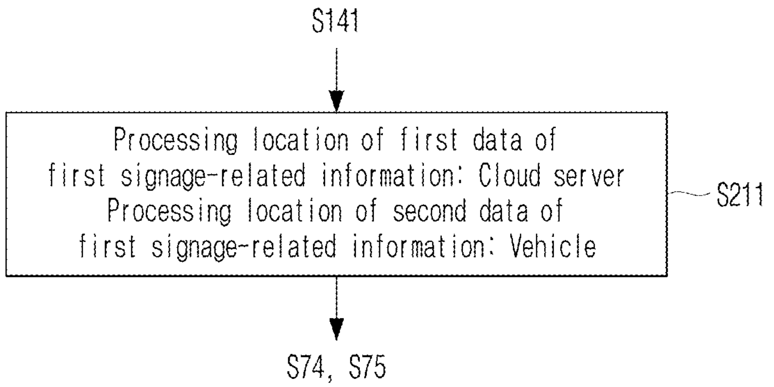
FIG. 21 is a flowchart illustrating logic for determining a processing location according to an embodiment of the present disclosure.
Figure 22:
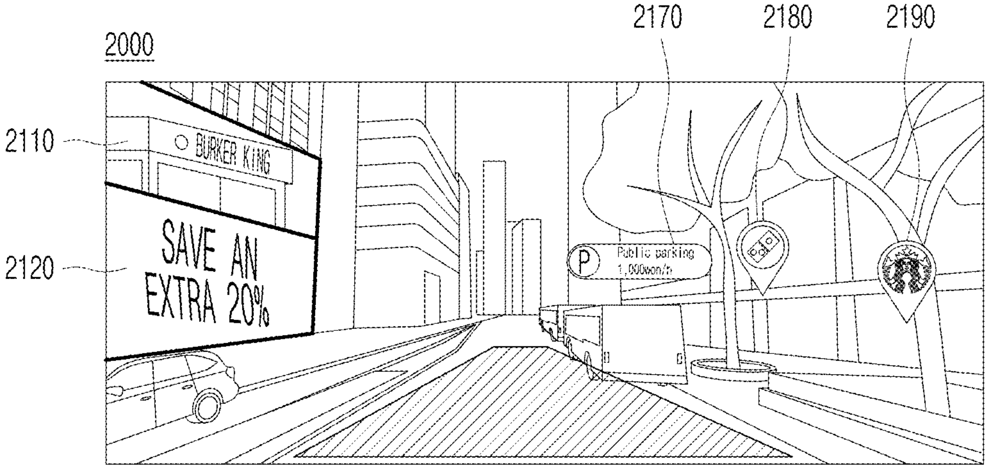
FIG. 22 illustrates a driving image in which AR signage graphic data is displayed according to an embodiment of the present disclosure.

With respect to the FIG. 14 and FIG. 15 described above, it has been explained that when the size of the data of the first signage-related information is large, the first signage-related information is processed in the cloud server 200. However, in this case, the first signage-related information may be distributed and processed between the vehicle 100 and the cloud server 200. This will be further explained with reference to FIGS. 21 and 22. FIG. 21 is a flowchart illustrating the logic for determining a processing location according to an embodiment of the present disclosure, and FIG. 22 illustrates a driving image on which AR signage graphic data is displayed according to an embodiment of the present disclosure.

As described above, the cloud policy manager 400 may consider a data size of the first signage-related information when determining the processing location of the first signage-related information [S141].

When the data size of the first signage-related information is greater than or equal to a predetermined value, the cloud policy manager 400 may distribute the first signage-related information and determine the processing location of the first signage-related information as both the vehicle 100 and the cloud server 200 [S211].

The first signage-related information may be divided according to data type. For example, from among the first signage-related information, data related to AR signage graphic for advertisements may be classified as first data, and from among the first signage-related information, data related to AR signage graphic for point of interest (POI) may be classified as second data. This distinction is merely exemplary, and the first signage-related information may be divided according to other references.

The cloud policy manager 400 may determine the processing location of the first data as the cloud server 200 and the processing location of the second data as the vehicle 200.

FIG. 22 illustrates an example in which AR signage graphic data 2110 and 2120 processed by the cloud server 200 as a relationship classified as first data and AR signage graphic data 2170, 2180, and 2190 processed by the vehicle 100 as a relationship classified as second data are displayed together with the driving image 100.

It has been described above that the first signage-related information is distributed and processed by both the cloud server 200 and the vehicle 100. However, as described above, the filtering of the first signage-related information into the second signage-related information is performed in the cloud server 200, and the conversion of the filtered second signage-related information into media content such as AR graphic data is performed in the vehicle 100, and thus the cloud server 200 and the vehicle 100 may cooperate to process the first signage-related information. This type of cooperative first signage-related information processing may be performed when the size of the first signage-related information data is large or for a specific data type of the first signage-related information (e.g., a type related to an emergency notification such as recall information or time sale). The first signage-related information processing in this type of cooperative method has been described above, and thus a detailed description will be omitted.

When the vehicle 100 first travels in a certain path, the media content to be displayed during the path needs to be processed, but when the vehicle 100 repeatedly travels in the path thereafter, the media content that is previously displayed may be reused as is without a need to process the media content again. This will be explained with reference to FIG. 5.

Media content displayed together with the driving image may be stored in the memory 170 (for example, but not limited to, cache memory).

The edge policy manager 1100 of the vehicle 100 may feedback the media content and/or an identifier thereof stored in the memory 170 to the cloud policy manager 400 in real time, periodically, or aperiodically when a specific event occurs. An example of the "specific event" may include (but is not limited to) detection of repeated driving of the same path by the vehicle 100.

Then, when the cloud policy manager 400 detects that the vehicle 100 travels in the same path through the driving context data received in real time from the vehicle 100, it may prevent data related to the fed-back media content from being provided to the vehicle from among the media content to be displayed during the same path or the signage-related data.

Instead, the cloud policy manager 400 may transmit a control signal to the edge policy manager 1100 of the vehicle 100 such that the media content stored in the memory 170 is displayed together with the driving image when the vehicle 100 travels in the same path.

However, from among the media content to be displayed during the same path or the signage-related data related thereto, data that is not identical to the data related to the fed-back media content (e.g., newly updated or added data) may be processed by the cloud server 200 and/or the vehicle 100 in the same manner as described above.

In response to the control signal, the edge policy manager 1100 may transmit the driving context data received from the driving context data manager 300 and the second signage-related information or the media content stored in the memory 170 (for example, but not limited to, a cache memory) within the vehicle 100 to the edge signage data processor 1000. Alternatively, the edge policy manager 1100 may control the edge signage data processor 1000 to directly access the memory 170 and read out second signage-related information.

The edge policy manager 1100 may derive a display policy for signage data to be displayed through the vehicle 100 based on the driving context data (particularly, a profile of the user) and transmit the derived display policy to the signage data processor 1000.

When utilizing the second signage-related information stored in the memory 170, the edge signage data processor 1000 may convert the second signage-related information that complies with the display policy into media content and transmit the converted media content to the rendering module 800. When utilizing the second signage-related information stored in the memory 170, the signage data processor 1000 may transmit the media content that complies with the display policy to the rendering module 800. The media content transmitted to the rendering module 800 is tagged with the display location information.

The rendering module 800 may match the media content to the corresponding location or the corresponding topography or object when the vehicle 100 is determined to approach the corresponding location of the media content within a predetermined distance or when the corresponding topography or feature is recognized through the driving image.

The media content may be displayed through a display unit 151 together with the driving image to match the corresponding location or the corresponding topography or feature.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller of the AI device.

The invention claimed is:

1. A method of providing data for a vehicle display device, the method comprising:

receiving driving context data from a vehicle;

collecting signage-related information from an external data source;

extracting first signage-related information corresponding to the vehicle from among the collected signage-related information based on the driving context data;

determining a display policy for media content to be displayed in the vehicle based on the driving context data;

determining a processing location of the first signage-related information based on the driving context data and the first signage-related information;

transmitting the first signage-related information based on the determined processing location; and based on the processing location being determined as a cloud server, filtering second signage-related information from among the first signage-related information in the cloud server based on the display policy.

2. The method of claim 1, wherein the display policy includes a condition for filtering second signage-related information estimated to be preferred by a user from among the first signage-related information based on a profile of the user of the vehicle in the driving context data.

3. The method of claim 1, further comprising:

converting the second signage-related information into the media content by the cloud server.

4. The method of claim 3, further comprising providing the second signage-related information to the vehicle or providing the media content to the vehicle.

5. The method of claim 4, wherein, based on the processing location being determined solely as the cloud server, the media content is provided to the vehicle, and based on the processing location being determined as the cloud server and the vehicle, the second signage-related information is provided to the vehicle.

6. The method of claim 1, further comprising, based on the processing location being determined as the vehicle, providing the first signage-related information to the vehicle.

7. The method of claim 1, wherein the processing location is determined based on a change possibility of the first signage-related information.

8. The method of claim 1, wherein the processing location is determined based on a data size of the first signage-related information.

9. The method of claim 1, wherein the processing location is determined based on an area of a signage displayable area according to the driving context data.

10. The method of claim 1, wherein the processing location is determined based on a communication situation with the vehicle.

11. The method of claim 1, wherein the processing location is determined based on driving stability of the vehicle according to the driving context data.

12. The method of claim 4, further comprising receiving feedback from the vehicle on the media content displayed in the vehicle, wherein media content identical to the feedback-received media content is not provided to the vehicle.

13. A vehicle display device for communicating with a cloud server, the vehicle display device comprising:

a driving context data manager configured to generate driving context data from edge data collected from a vehicle;

an edge signage data processor including a signage data filtering module configured to filter second signage-related information from among first signage-related information based on the display policy upon receiving a display policy and first signage-related data from the cloud server;

a rendering module configured to match the media content to a corresponding location of the media content upon receiving media content from the cloud server;

a display configured to display the media content together with a driving image to match the corresponding location;

a memory configured to store the displayed media content; and an edge policy manager configured to provide media content that complies with the display policy from among the stored media content to the rendering module, based on the vehicle repeatedly traveling in a same path.

14. The vehicle display device of claim 13, wherein the edge policy manager is configured to determine a display policy separate from a display policy to be received from the cloud server based on the driving context data.

15. The vehicle display device of claim 14, wherein the edge policy manager is configured to determine a condition for filtering second signage-related information estimated to be preferred by a user from among first signage-related information as the display policy based on a profile of the user of the vehicle in the driving context data.

16. The vehicle display device of claim 13, wherein the edge signage data processor further includes a media content processing module configured to convert second signage-related information into the media content.

17. The vehicle display device of claim 16, wherein the edge signage data processor is configured to provide the converted media content to the rendering module to be displayed together with the driving image.

18. The vehicle display device of claim 17, wherein the edge policy manager is configured to feedback the stored media content to the cloud server.

19. The vehicle display device of claim 13, wherein the driving context data includes at least one of driving path related data, safe driving related data, computational resource amount information of the vehicle, signage displayable area information, communication environment information, user information, and a user profile.

* * * * *